United States Patent [19]

Doyama et al.

[11] Patent Number: 5,222,371

[45] Date of Patent: Jun. 29, 1993

[54] AIR CONDITIONER OF MULTICHAMBER TYPE

[75] Inventors: Yoshiaki Doyama, Hirakata; Koji Ebisu, Katano; Masataka Ozeki, Moriguchi; Yuji Yoshida, Itami, all of Japan

[73] Assignee: Matsushita Electric Industrial Co., Ltd., Osaka, Japan

[21] Appl. No.: 634,349

[22] Filed: Dec. 26, 1990

[30] Foreign Application Priority Data

Dec. 28, 1989 [JP] Japan .................................. 1-342646
Oct. 29, 1990 [JP] Japan .................................. 2-292265

[51] Int. Cl.⁵ ............................................. F25B 11/04
[52] U.S. Cl. ...................................... 62/204; 62/211; 62/225; 62/228.3; 62/229
[58] Field of Search .................. 62/204, 226, 225, 229, 62/227, 228.3, 222, 223, 208, 210

[56] References Cited

U.S. PATENT DOCUMENTS 4,932,220  6/1990  Inoue ..................................... 62/226

Primary Examiner—John M. Sollecito
Attorney, Agent, or Firm—Wenderoth, Lind & Ponack

[57] ABSTRACT

A multichamber air conditioner which is provided with a unit for obtaining the characteristics which are approximately conformable to the reverse characteristics of the desired control dynamic characteristics, an integrator, a unit for receiving the detected room temperature as the input of the above described reverse characteristics unit, comparing the output of the above described reverse characteristic unit with the set value, inputting the compared results to the above decided integrator, controlling the opening of the expansion valve by the output of the integrator, outputting the integration gains of the above described integrator in accordance with the open air temperatures, the total sum of the number of driver stands, the performance, and the variation in the compressor suction pressure.

3 Claims, 17 Drawing Sheets

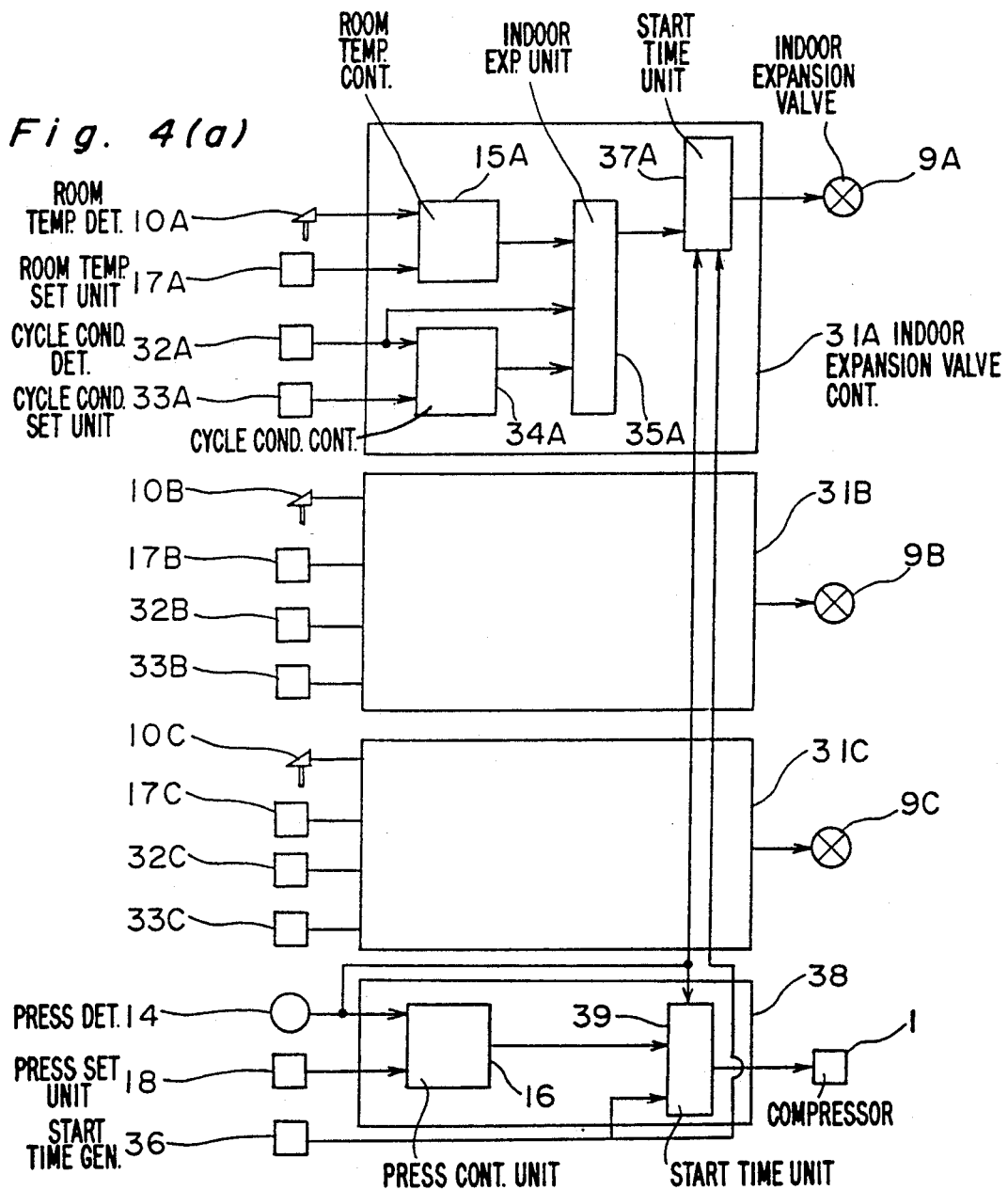

AIR CONDITIONER OF MULTICHAMBER TYPE

BACKGROUND OF THE INVENTION

The present invention generally relates to the control of the amount of opening of each of a plurality of indoor expansion valves, and the rotational speed of a compressor in an air conditioner of multichamber type.

FIG. 1 is a system block diagram of a conventional multichamber air conditioner having: a compressor 1; a four-way valve 2 for switching between cooling and heating cycles; an outdoor heat exchanger 3; and outdoor expansion valve 4; an accumulator 5 provided on an outdoor machine unit 6. Each of a plurality of indoor machines 7A, 7B, and 7C is respectively provided with: indoor heat exchangers 8A, 8B, 8C; indoor expansion valves 9A, 9B, and 9C; and room temperature detectors 10A, 10B, and 10C. They are respectively disposed in the respective rooms 11A, 11B, 11C. The gas side and the liquid side of outdoor machine 6 and the respective indoor machines 7A, 7B; and 7C are respectively connected by a gas side duct 12 and a liquid side duct 13 into closed circuits. A pressure detector 14 is provided on the gas side duct 12. The system operates with a known heat pump cycle with the refrigerant being charged within the closed circuit.

The operation of the multichamber air conditioner of such a construction is described hereinafter. As shown by the solid lines of FIG. 1, during the heating operation, the refrigerant is compressed in the compressor 1 into a gas of a higher temperature and a higher pressure, and is discharged into the gas side duct 12 through the four-way valve 2, and reaches each of the indoor heat exchangers 8A, 8B, and 8C within each of the indoor machines 7A, 7B, and 7C. At such a time, each of the indoor heat exchangers 8A, 8B, and 8C functions as a condenser to heat the air of each room 11A, 11B, and 11C, so that each room 11A, 11B, and 11C is heated so as to turn the refrigerant into a condensed liquid. The pressure of the liquefied refrigerant is properly reduced in the outdoor expansion valve 4 and through each indoor expansion valve 9A, 9B, and 9C and a liquid side duct 13, and reaches the outdoor heat exchanger 3. At such a time, the outdoor heat exchanger 3 functions as an evaporator, and receives the heat from the open air so that the liquid is evaporated into a lower pressure vapor, and is sucked into the compressor 1 through the four-way valve 2, and the accumulator 5.

During the cooling operation, as shown in the broken lines of FIG. 1, the outdoor heat exchanger 3 functions as a condenser by the switching operation of the four-way valve 2. Each of the indoor heat exchangers 8A, 8B, and 8C functions as an evaporator. The respective chambers 11A, 11B, and 11C are cooled by the endothermic operation from the air of the respective rooms 11A, 11B, and 11C.

The operation of the respective indoor expansion valves 9A, 9B, and 9C is described hereinafter. When the openings of the respective indoor expansion valves 9A, 9B, and 9C increase, the amount of flow of the refrigerant increases. During the heating operation, the room temperatures of the respective rooms 11A, 11B, and 11C rise. During the cooling operation, the room temperatures are reversibly lowered. The temperatures thereof are detected by the respective room temperature detectors 10A, 10B, and 10C.

The operation of the compressor machine 1 is described hereinafter. When the rotational speed of the compressor 1 is increased, the amount of flow of the refrigerant is increased. During the heating operation, the refrigerant pressure in the gas side duct 12, which becomes a high pressure gas duct, rises. During the cooling operation, the refrigerant pressure in the gas side duct 12, which becomes a low pressure gas duct, decreases. The pressures are detected by the pressure detector 14.

In such a multichamber air conditioner, the control of the room temperature corresponds to the load of each room 11A, 11B, and 11C, and the controlling of the pressure corresponds to the total of the loads of the rooms.

FIG. 2 is a block diagram of each of the room temperature controller, and a pressure controllers of the conventional multichamber air conditioner. The respective room temperature controllers 15A, 15B, and 15C and the pressure controller 16 are so called PID controllers; the respective subtracting units 19A, 19B, 19C, and 19D are for outputting the differences among the respective outputs of the respective room temperature setting units 17A, 17B, and 17C used for setting the target values of the respective room temperatures of the respective rooms 11A, 11B, and 11C and a pressure setting unit 18 is used for setting the target value of the pressure; room temperature detectors 10A, 10B, and 10C and a pressure detector 14 are provided; integrating units 20A, 20B, 20C, and 20D are provided for integrating the respective outputs of the respective subtracting units 19A, 19B, 19C, and 19D; differentiating units 21A, 21B, 21C, 21D, 22A, 22B, 22C, and 22D are provided for differentiating the respective outputs of the respective subtracting units 19A, 19B, 19C, and 19D which are proportional coefficient setting units; elements 23A, 23B, 23C, and 23D are integral coefficient setting units; elements 24A, 24B, 24C, and 24D are differential coefficient setting units, elements 25A, 25B, 25C, and 25D are first multiplication units for outputting the products between the respective outputs of the respective subtracting units 19A, 19B, 19C, and 19D and the respective outputs of the respective proportional coefficient setting units provided 22A, 22B, 22C, and 22D; elements 26A, 26B, 26C, and 26D are second multiplication units for outputting the products between the respective outputs of the respective integrating units 20A, 20B, 20C, and 20D and the respective outputs of the respective integration coefficient setting units provided 23A, 23B, 23C, and 23D; elements 27A, 27B, 27C, and 27D are third multiplication units provided for outputting the products between the respective outputs of the differentiating units 21A, 21B, 21C, and 21D and the respective outputs of the differential coefficients setting units 24A, 24B, 24C, and 24D; adding units 28A, 28B, and 28C are for outputting the sums of the respective first multiplication units 25A, 25B, 25C, and 25C, 25D, the respective second multiplication units 26A, 26B, 26C, and 26D, and the respective third multiplication units 27A, 27B, 27C, and 21D; the amount of opening of the respective indoor expansion valves 9A, 9B, and 9C and the rotational speed of the compressor 1 are controlled by the respective outputs of the respective adding units 28A, 28B, and 28C.

The operation of the room temperature setting unit and the pressure controlling unit of such a construction 18 described hereinafter. During the cooling operation, the loads of the respective rooms 11A, 11B, and 11C are increased and the room temperatures are raised. The rise of the room temperature is detected by the respective room temperature detectors 10A, 10B, and 10C. The amount of opening of the respective indoor expansion valves 9A, 9B, and 9C are increased in the respective room temperature controlling units 15A, 15B, and 15C so as to conform to the room temperatures set by the respective room temperature setting units 17A, 17B, and 17C. The pressure changes are detected by the pressure detector 14, and the rotational speed of the compressor 1 is increased by the pressure controlling unit 16 so as to conform to the pressure established by the pressure setting unit 18. Namely, the rotational speed of the compressor 1 changes by an amount proportional to the sum of the value of the loads of the respective chambers 11A, 11B, and 11C. If the respective coefficients of the respective proportional coefficients setting units 22A, 23B, 22C, and 22D, the respective room temperature controlling units 15A, 15B, and 15C and the pressure controlling unit 16, the respective integrating coefficients setting units 23A, 23B, 23C, and 23D and the respective differential coefficients setting units 24A, 24B, 24C, and 24D are properly set in accordance with the characteristics in the output changes in the respective room temperature detectors 10A, 10B, and 10C with respect to the amount of opening changes in the respective indoor expansion valves 9A, 9B, and 9C and the output changes in the pressure detector 14 with respect to the changes of the compressor 1, then the respective outputs of the respective room temperature detectors 10A, 10B, and 10C and the pressure detector 14 conforms to the respective outputs of the respective room temperature setting units 17A, 17B, and 17C and the pressure setting unit 18 in accordance with the proper responses.

But in such a multichamber air conditioner, the amount of opening of the respective indoor expansion valves 9A, 9B, and 9C are controlled only by the outputs of the respective room temperature detectors 10A, 10B, and 10C and the rotational speed of the compressor 1 is controlled only by the output of the pressure detector 14 independently of the cycle condition within each of the indoor heat exchangers 8A, 8B, and 8C. Thus, in the variation of the room temperature set values, difference in the responses of the respective room temperatures due to the drift of the refrigerant occur, with a problem in that the responses at the partial room temperatures are delayed. Also, at the starting time, the pressure responses are delayed in the return from the initial pressure reduction because of the maldistribution of the refrigerant, with a problem that the rising time is delayed.

In such a multichamber air conditioner, the characteristics change if the operational conditions change. In a PID control system, the stability and response of the control system both change with respect to changes in operating conditions, with a problem in that the response speed has to be sacrificed so as to obtain stability. Furthermore, there is also a problem in that the response speed changes if the PID control parameters corresponding to the respective operation conditions change.

Although a table of the operation amounts corresponding to the operation conditions or the like must be set into the system in a table reference system, combination of operation conditions becomes enormous if the number of operation points increases, so that the size of the table increases so enormously that the combinations can not be really coped with.

In the control system of the compressor, a occurs phenomenon where the suction pressure is largely reduced and cannot be returned to the target value in the starting of the compressor when the drift of the refrigerant becomes large after the passage of time in the stopped condition. Namely, the suction pressure is lowered to cause a condition where the rotational speed of the compressor is reduced, with a problem in that the suction pressure can not reach the target value.

SUMMARY OF THE INVENTION

Accordingly, the present invention has been developed with a view to substantially eliminating the above discussed drawbacks inherent in the prior art multichamber air conditioners and has for its essential object to provide an improved air conditioner of the multichamber type.

In accomplishing these and other objects, according to the present invention, in addition to room temperature controlling units being provided for controlling the temperatures of the respective rooms, cycle condition detectors for detecting the respective cycle condition amounts in the exit portions of indoor heat exchangers; the respective cycle condition amount controlling units are provided for conforming the respective detected cycle condition amount to the respective set values; an indoor expansion valve operation amount deciding unit is provided for switching the operation amounts of the respective cycle condition amount controlling units and the respective room temperature controlling units in accordance with the respective cycle condition amounts with respect to the drift of the refrigerant; a starting time compressor operation amount deciding unit and a starting time indoor expansion valve operation amount deciding unit for switching, in accordance with the pressure differential amounts, a starting time expansion valve opening set value and a starting time compressor rotational speed set value for quickly removing the refrigerant maldistribution at the starting time; the operation amount of the pressure controlling unit and the operation amount of the indoor expansion valve operation amount deciding unit are determined with respect to the maldistribution of the refrigerant at the starting time; the amount of opening of the respective indoor expansion valves and the rotational speed of the compressor are determined by the operation amounts of the starting time compressor operation amount deciding unit and the starting time indoor expansion valve operation amount deciding unit.

In the present invention, by such a multichamber air conditioner as described hereinabove, in the respective indoor expansion valve operation amount deciding unit, if the loads in the respective indoor heat exchangers are within the proper range, the operation amounts of the respective room temperature controlling units are selected as the operation amounts of the openings of the respective indoor expansion valves, and the operation amounts of the respective cycle condition amount controlling units are selected as the operation amounts of the openings of the respective indoor expansion valves when the loads in the respective indoor heat exchangers are excessive, so that the room temperature control may be normally realized under the proper cycle condition. Furthermore, with respect to the maldistribution condition of the refrigerant at the starting time, a starting time expansion valve opening set value and a starting time compressor rotational speed set value are selected for quickly removing the refrigerant maldistribution at the starting time, the operation amount of the pressure controlling unit and the operation amount of the indoor expansion valve operation amount deciding unit are quickly selected after removing of the refrigerant maldistribution, so that the quick removing of the refrigerant maldistribution at this starting operation may be realized.

Also, the present invention is provided with a means for obtaining characteristics which are approximately conformable to the reverse characteristics of the desired control dynamic characteristics, an integrating means, a means for receiving the detected room temperature as the input from the above described reverse characteristics means, and for comparing the output of the above described reverse characteristic means with the set value, and for inputting the compared results to the above decided integrating means, and for controlling the opening of the expansion valve in accordance with the output of the integrating means, and for outputting the integration gains of the above described integrating means in accordance with the open air temperatures, the total sum of the number of driver stands, the performance, and the variation amount in the compressor suction pressures.

Further, the present invention is provided with a means which is approximately conformable to the reverse characteristics of the desired control dynamic characteristics at the starting time. an integration means, a means which is approximately conformable to the reverse characteristics of the desired control dynamic characteristics at a steady state time, an integrating means, a means having a detected compressor suction pressure as an input thereto, for comparing the output of the reverse characteristic means with a target suction pressure, and for inputting the compared results to the integrating means, and for controlling the rotational speed of the compressor in accordance with the output of the integrating means, and the detecting the variation in the compressor suction pressure; wherein the reverse characteristic means and the integrating means are switched to the means for steady state use from the starting means by a fuzzy logic mean when the variation of the compressor suction pressure is changed from the negative to the positive.

BRIEF DESCRIPTION OF THE DRAWINGS

These and other objects and features of the present invention will become apparent from the following description taken in conjunction with the preferred embodiment thereof with reference to the accompanying drawings, in which;

FIGS. 4(a) and 4(b) are block diagrams of an indoor expansion valve controlling unit and a compressor controlling unit of an air conditioner of the multichamber type in accordance with the present invention;

FIG. 5 is a flowchart showing an embodiment method of two control modes in FIG. 5;

DETAILED DESCRIPTION OF THE INVENTION

Figure 1:
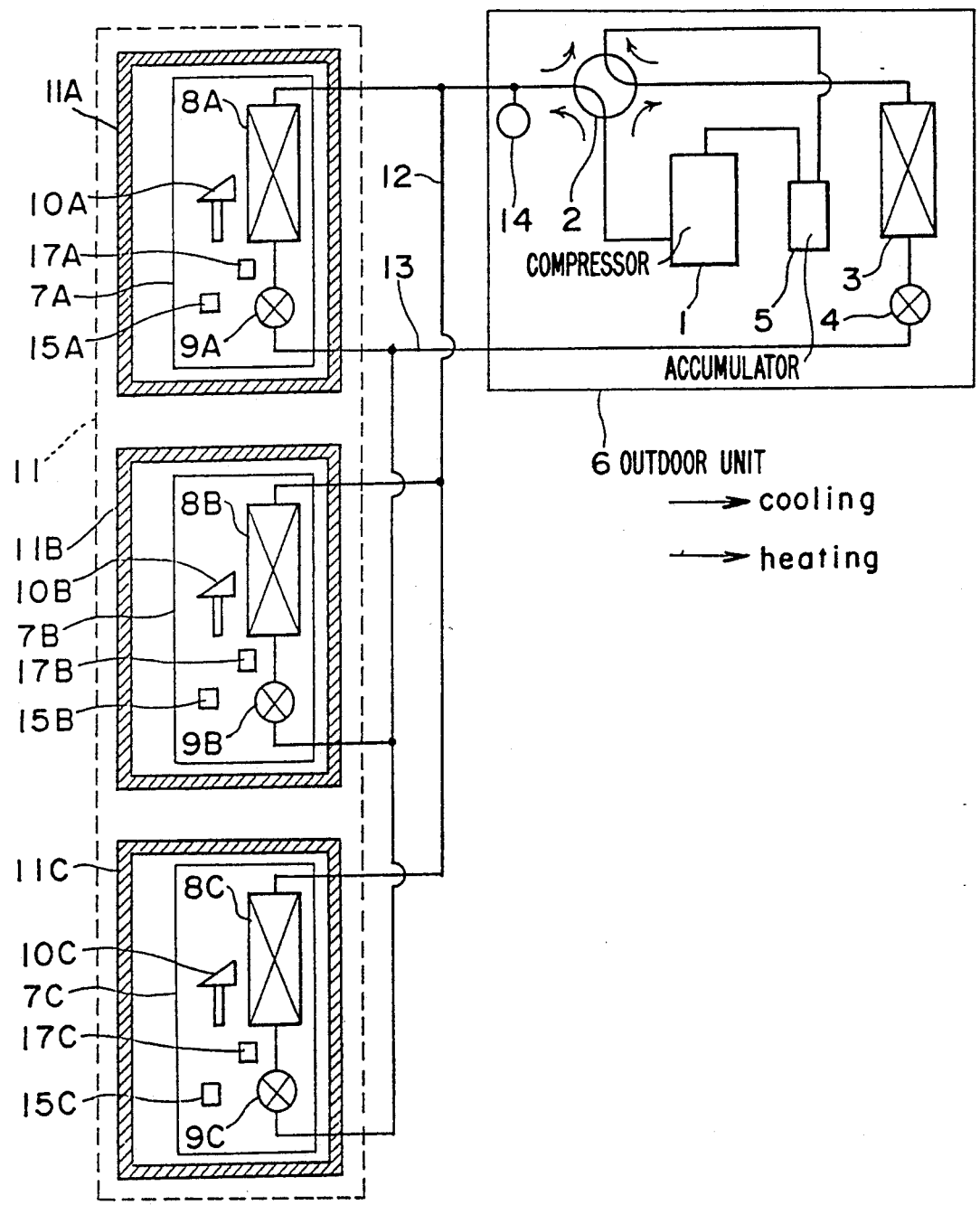
FIG. 1 is a system block diagram of the conventional multichamber air conditioner.
Figure 2:
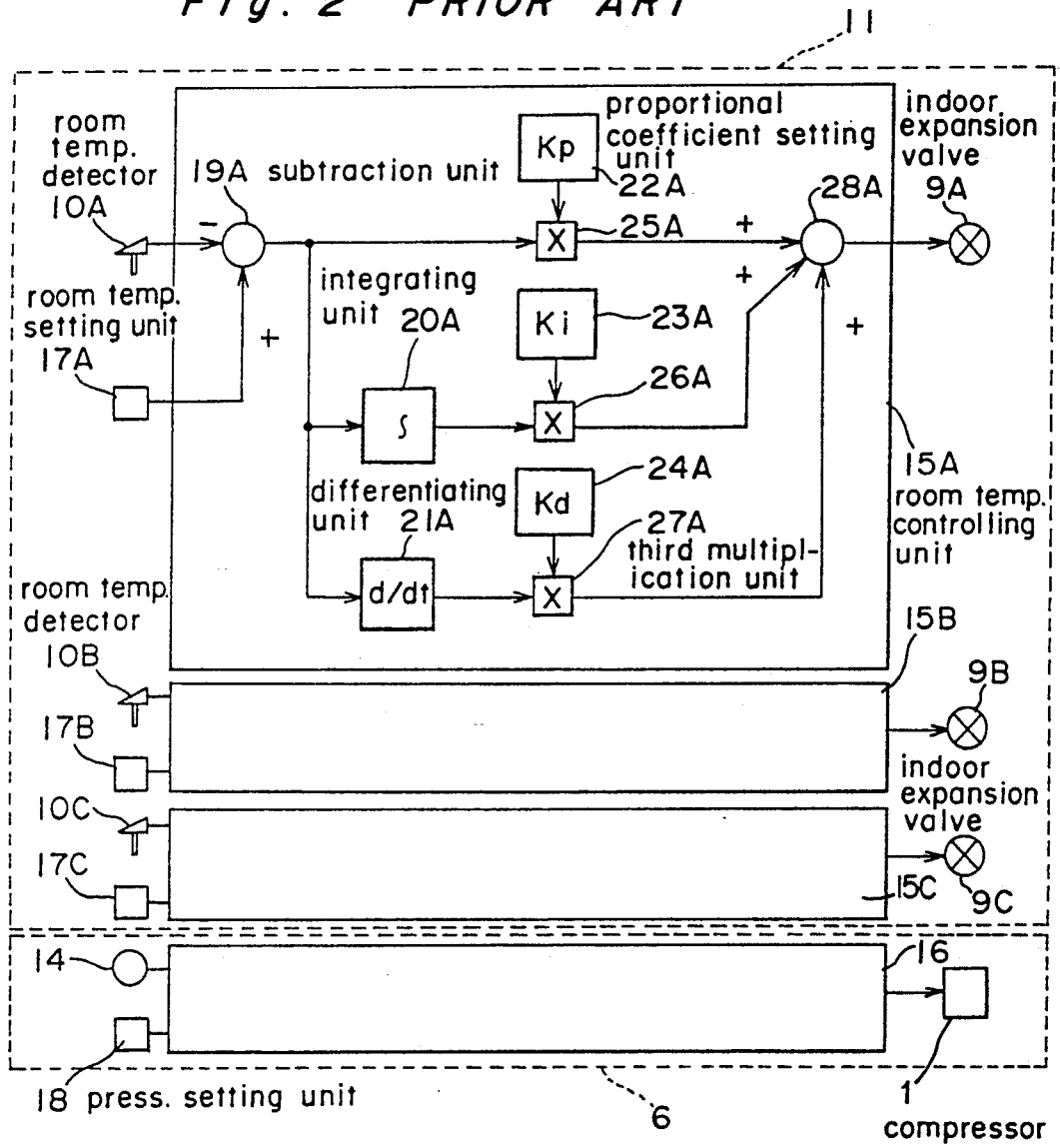
FIG. 2 is a block diagram of each room temperature controlling unit of the conventional multichamber air conditioner.

Before the description of the present invention proceeds, it is to be noted that like parts are designated by like reference numerals throughout the accompanying drawings.

The embodiment of an air conditioner of the multichamber type in accordance with the present invention will be described hereinafter with reference to the drawings.

Figure 3:
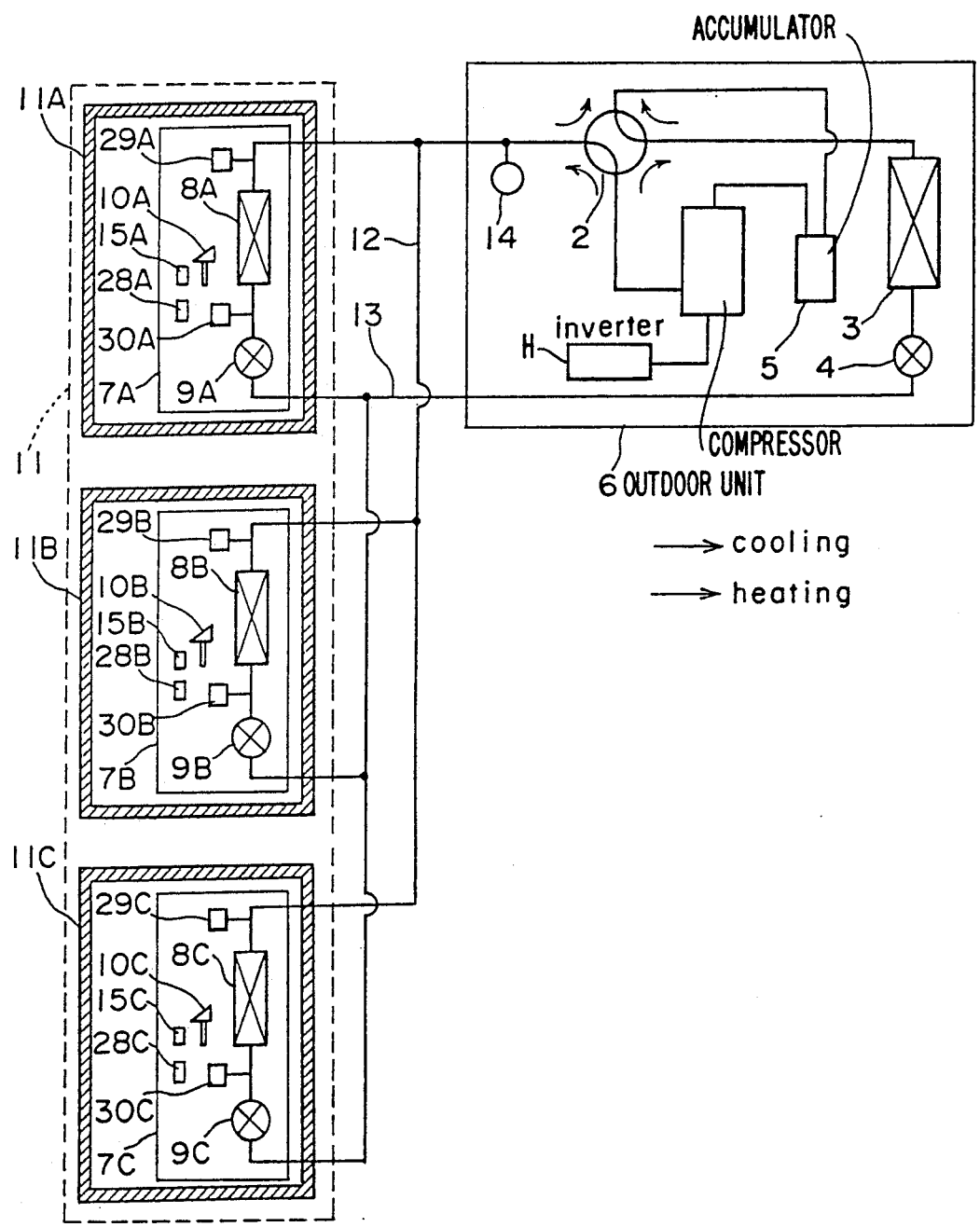
FIG. 3 is a system block diagram of an air conditioner of the multichamber type in accordance with the present invention.
Figure 4B:
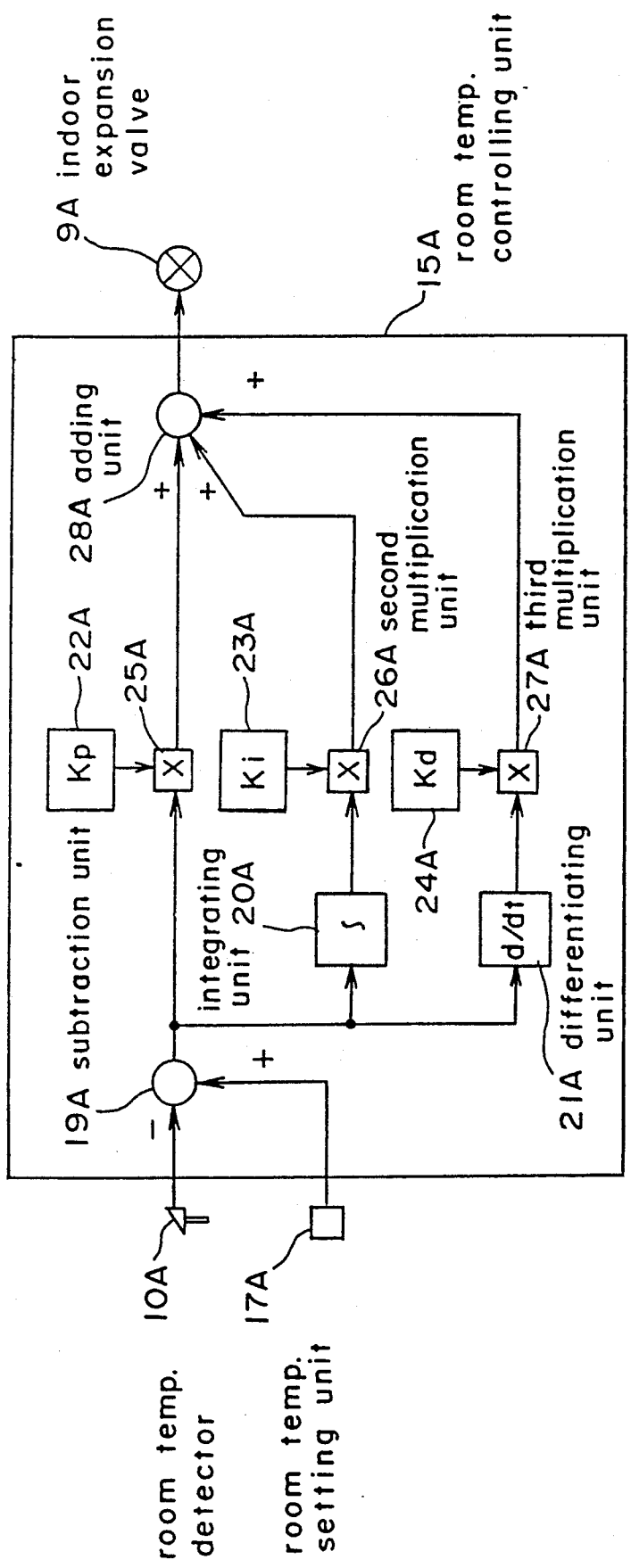

FIG. 3 and FIGS. 4(a) and 4(b) show construction of an air conditioner of the multichamber type in accordance with the present invention, which is common in the respective embodiments.

FIG. 3 is a system block diagram of an air conditioner of the multichamber type, including: a compressor 1; a four-way valve 2 for switching between cooling and heating cycles; an outdoor heat exchanger 3; an outdoor expansion valve 4; and an accumulator 5; all of these elements being provided on an outdoor unit 6. Indoor units 7A, 7B, and 7C are provided respectively with: indoor heat exchangers 8A, 8B, and 8C; indoor expansion valves 9A, 9B, and 9C; room temperature detectors 10A, 10B, and 10C; these units being disposed in respective chambers 11A, 11B, and 11C. The respective gas sides and liquid sides of the outdoor machine unit 6 and the respective indoor units 7A, 7B, and 7C are connected by respective gas side lines 12 and the liquid side lines 13 into closed circuits. The gas side line 12 is provided with a pressure detector 14, and the system operates in a known heat pump cycle with the refrigerant being charged within the closed circuit.

Furthermore, overheat detectors 29A, 29B, and 29C and overcooling detectors 30A, 30B, and 30C are mounted on the respective indoor units 7A, 7B, and 7C with the elements which are the same as those of FIG. 3 being designated by like reference numerals.

FIGS. 4(a) and 4(b) are block diagrams of the respective room temperature controlling units and the pressure controlling units of the air conditioner of the multichamber type. The room temperature controlling units 15A, 15B, and 15C and the pressure controlling unit 16 are so called PID controlling units; subtracts 19A, 19B, 19C, and 19D output the differences amount the respective outputs of room temperature setting units 17A, 17B, and 17C for setting the target values of the respective room temperatures of the respective rooms 11A, 11B, and 11C and a pressure setting unit 18 sets the target value of the; room temperature detectors 10A, 10B, and 10C and a pressure detector 14 are provided integrators 20A, 20B, 20C, and 20D integrate the outputs of the respective subtracters 19A, 19B, 19C, and 19D; differentiating units 21A, 21B, 21C, 21D, 22A, 22B, 22C, and 22D differentiate the outputs of the respective subtracters 19A, 19B, 19C, and 19D are respectively form proportional coefficient setting units elements 23A, 23B, 23C, and 23D are integral coefficient setting units; elements 24A, 24B, 24C, and 24D are differential coefficient setting units, elements 25A, 25B, 25C, and 25D are first multiplication units for outputting the products between the respective outputs of the subtracting units 19A, 19B, A9C, and 19D and the respective outputs of the proportional coefficient setting units 22A, 22B, 22C, and 22D; elements 26A, 26B, 26C, and 26D are second multiplication units for outputting the products between the respective outputs of the integrating units 20A, 20B, 20C, and 20D and the respective outputs of the integration coefficient setting units 23A, 23B, 23C, and 23D; reference elements 27A, 27B, 27C, and 27D are third multiplication units for outputting the products between the respective outputs of the differentiating units 21A, 21B, 21C, and 21D and the respective outputs of the differential coefficients setting units 24A, 24B, 24C, and 24D; adding units 28A, 28B, and 28C output the sums of the respective first multiplication units 25A, 25B, 25C, and 25C, 25D, the respective second multiplication units 26A, 26B, 26C, and 26D, and the respective third multiplication units 27A, 27B, 27C, and 21D; the openings of the respective indoor expansion valves 9A, 9B, and 9C and the rotational speed of the compressor 1 are controlled by the respective outputs of the adding units 28A, 28B, and 28C.

The operation of such an air conditioner of the multichamber type is described hereinafter. In the case of overload condition at the change time of the respective set room temperature values, the openings of the respective indoor expansion valves 9A, 9B, and 9C become excessive. During a heating operation, the overcooling amount is reduced. During a cooling operation, the overheating amount is reduced. These cycle condition amounts are detected by the overheat detectors 29A, 29B, and 29C or the overcooling detectors 30A, 30B, and 30C.

FIGS. 4(a) and 4(b) a block diagram of an indoor expansion valve controlling unit and a compressor controlling unit of the multichamber shaped air conditioner in accordance with the present invention. The respective indoor expansion valve controlling units 31A, 31B, and 31C are provided with respective room temperature controlling units 15A, 15B, and 15C which input the signals from respective room temperature setting units 17A, 17B, and 17C and the signals from respective room temperature detectors 10A, 10B, and 10C; the respective cycle condition amount controlling units 34A, 34B, and 34 input the signals from respective cycle condition amount detectors 32A, 32B, 32C which are the respective overcooling detectors 30A, 30B, and 30C during the heating operation, and input the signals from respective cycle condition amount setting units 33A, 33B, and 33C which set the target values of the respective cycle condition amounts; indoor expansion valve operation amount deciding units 35A, 35B, and 35C decide the operations of the respective indoor expansion valves 9A, 9B, and 9C in accordance with the outputs of the respective cycle condition amount detectors 32A, 32B, and 32C, the operation amounts of the respective room temperature controlling units 15A, 15B, and 15C and the operation amounts of the respective cycle condition amount controlling units 34A, 34B, and 34C; starting time indoor expansion value operation amount deciding units 37A, 37B, and 37C decide the openings of the respective indoor expansion valves 9A, 9B, and 9C in accordance with the output of the starting signal generator 36 for transmitting signals at the operation starting time of the compressor 1, the output of the pressure detector 14, and the operation amounts by the respective indoor expansion valve operation amount deciding units 35A, 35B, 35; the openings of the respective indoor expansion valves 9A, 9B, and 9C are controlled by the operation amounts decided by the respective starting time indoor expansion valve operation amount deciding units 37A, 37B, and 37C.

The compressor controlling unit 38 is provided with a pressure controlling unit 16 which inputsthe signals from the pressure setting 18 and the pressure detector 14 and is also provided with a starting time compressor operation amount deciding unit 39 for deciding the rotational speed of the compressor 1 in accordance with the output of the starting signal generator 36, the output of the pressure detector 14, and the operation amount of the pressure controlling unit 16 so as to decide the number of the revolutions of the compressor 1, the rotational speed of the compressor 1 is controlled by with the operation amount decided by the starting time compressor operation amount deciding unit 39.

First Embodiment

Figure 5:
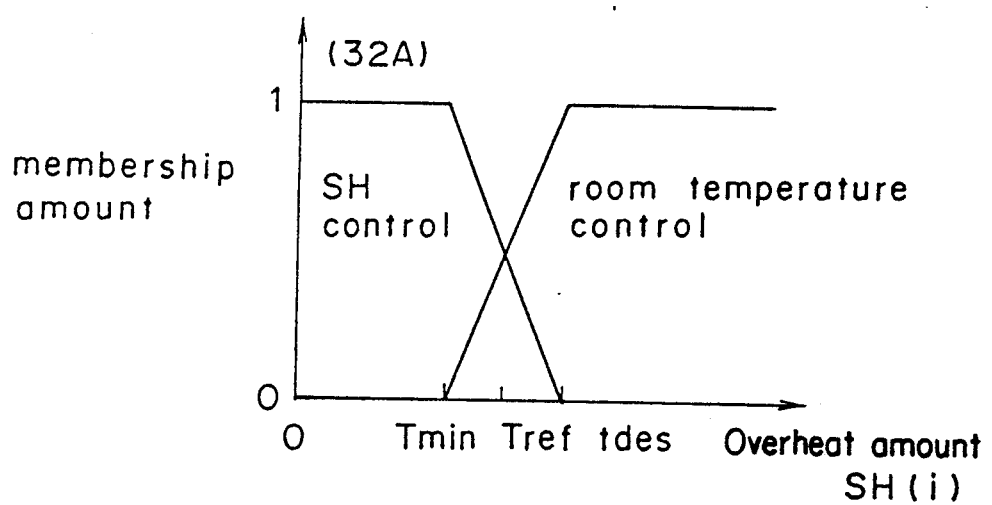
FIG. 5 is a chart for illustrating the switching logic of the two control modes in accordance with a first embodiment of the present invention.
Figure 6:
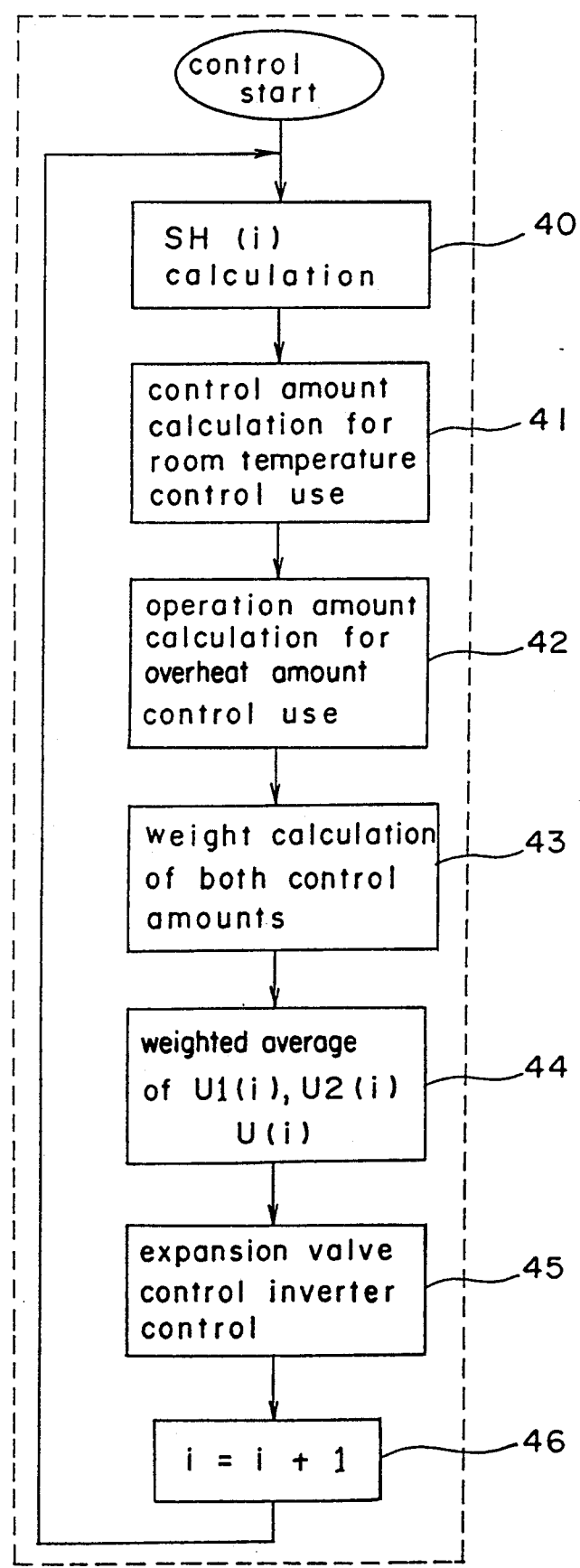

The first embodiment of the present invention will be described in accordance with FIG. 5 and FIG. 6. FIG. 5 shows a method of switching the two types of control objects in a fuzzy logical way. FIG. 6 shows a flowchart of a computer (not shown) for control use.

In FIG. 3, the refrigerant compressed by the compressor 1 is liquefied through the application of the heat onto the open air by an outdoor heat exchanger 3. The liquefied refrigerant is branched into the respective indoor units 11A, 11B, and 11C through piping. The pressure of the refrigerant is lowered, and the temperature is lowered by way of expansion valves 9A, 9B, and 9C in the respective indoor units. The refrigerant in temperature robs the indoor heat by the indoor heat exchangers 8A, 8B, and 8C so as to effect evaporation. The evaporated refrigerants join again and are fed into the compressor 1. Here the controlling apparatus (not shown) detects the room temperature of the each chamber by the room temperature sensors 10A, 10B, and 10C and the refrigerants are distributed in accordance with the heat loads of the respective chambers. The distribution controlling is realized by the adjustment of the openings of the expansion valves 9A, 9B, and 9C. Also, the controlling operation corresponding to the entire loads is realized through the controlling operation of the rotational speed of the compressor 1 by the inverter 1-1. Fundamentally, the room temperature control of each room is realized by the above described construction. The exit temperatures of the expansion valves 9A, 9B, and 9C of the respective indoor units 11A, 11B, and 11C are measured by the temperature sensors 30A, 30B, and 30C and the exit temperatures of the indoor heat exchangers 8A, 8B, and 8C are measured by the temperature sensors 29A, 29B, and 29C so as to calculate the overheat amount for each of the respective indoor units 11A, 11B, and 11C.

FIG. 5 shows a method in a case where the control logic of the computer (not shown) for the control use in FIG. 3 is effected by the use of fuzzy logic. Namely, the room temperature control becomes 100% on when the overheat amount SH (i) of the respective indoor machines (i) are larger than Tdes in a case where the optimum is Tdes, the overheat amount which is necessary to effect the control being Tref. When the overheat amount SH (i) is Tref, the overheat amount control and the room temperature control become 50:50. The superheat degree control ration becomes larger as the overheat amount SH (i) becomes smaller than Tref. When the overheat amount SH (i) becomes smaller than Tmin, only the overheat amount control occurs.

FIG. 6 is a flowchart showing the control processing procedure in a case where the fuzzy logic shown in FIG. 5 has been applied. The processing procedure will be described hereinafter. First, in the processing step 40, the present overheat amount SH (i) of each indoor unit (i) is described. Then, the processing goes to the processing step 41 so as to effect an operation for the room temperature control for calculating the operation amount ul (i). For example, a PID (proportional integration, differentiation) control is used as the processing means for the room temperature control. The overheat amount control is continuously effected at the processing step 42 to obtain the operation amount u2 (i). Then, the processing step goes to the processing 43 so as to calculate the membership amount with respect to the two operation amounts u1 (i), u2 (i). Then and the processing goes to the processing step 44 so as to effect weighed adding and averaging operations of the values of the two operation amounts u1 (i) and u2 (i). Then, the processing advances to the processing step 45 so as to output the addition average result u (i) as the operation amount. The output u (i) is used for the opening control of the respective expansion valves and for the rotational speed control of the compressor 1 by the inverter 1-1. The control objects are shifted one by one by the processing step 46, namely, the i is replaced by i+1 and the processing step is returned to the processing 40 again.

Although the above described embodiment has been described using the cooling operation, it is clear that the switching method of the two control modes may be easily applied even to a case of the heating operation. Also, although a method of detecting the overheat amount has been described by a method of detecting the exit temperature of the expansion valve and the exit temperature of the evaporator in the present embodiment, it is clear that it may be applied to even the case where the overheat amount is obtained by the detection of the suction pressure and the inlet temperature of the compressor, and a method of obtaining the overheat amount by the detection of the suction pressure and the evaporator exit temperature of the compressor.

As described hereinabove, with the present invention, it becomes possible to quickly operate the room temperature control and the overheat amount control in the respective rooms by the switching operation of the overheat amount control mode and the room temperature control mode by the use of fuzzy logic. Also, as the controlling of the overheat amount of each of the indoor units and the room temperature controlling is effected, it is a method of retaining the room temperature in the other rooms if the overheat amount control of one room is effected, with the effect thereof being larger.

Second Embodiment

Figure 7:
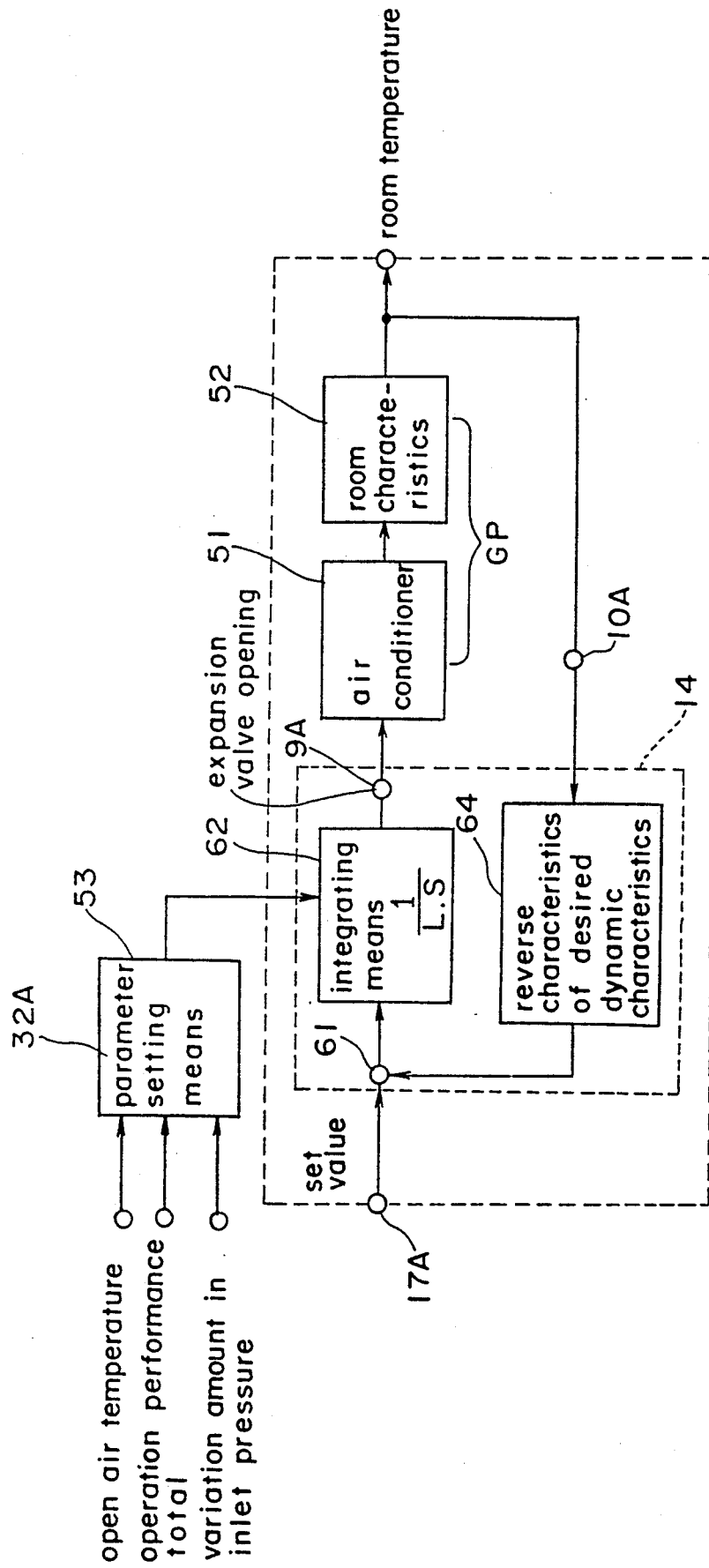
FIG. 7 is a block diagram showing the construction of a control system in accordance with a second embodiment of the present invention.

A second embodiment of the present invention will be described hereinafter with reference to the drawings. FIG. 7 is a block diagram of a control system of an air conditioner of the multichamber type in accordance with the present invention. The set values of the respective rooms are inputted into the comparison means 61 and are compared with the output of the reverse characteristic element of the desired dynamic characteristic. The compared results are fed to the integrating means 62. In the integrating means 62, the input value is integrated in time. The integrating gain is assumed to be (1/L). Here the L is set by a parameter setting means 53. The parameter setting means calculates the integrating gain under the open air temperature, the total amount of driver stands and performance, and the variation in the suction pressure of the compressor. The operation principle of the parameter setting means 53 will be described later. The results of the integrating means 62 are used to control the expansion valve openings of the respective rooms and are fed to the operating circuit (not shown) of the expansion valves of the respective room. The air conditioner 51 is operated by the control of the opening of the expansion valve. Thus, the heat is absorbed from the respective rooms. The characteristics where the heat is absorbed to lower the room temperature are shown in block 52 as the room characteristics. The room temperatures of the respective rooms are determined in this manner. The room temperatures of the respective rooms are detected by the room temperature detectors 10A, 10B, and 10C. The detected room temperature detectors 10A, 10B, and 10C. The detected room temperatures are inputted to the elements 64 having the reverse characteristics of the desired dynamic characteristics so as to complete the control loop.

Figure 8A:
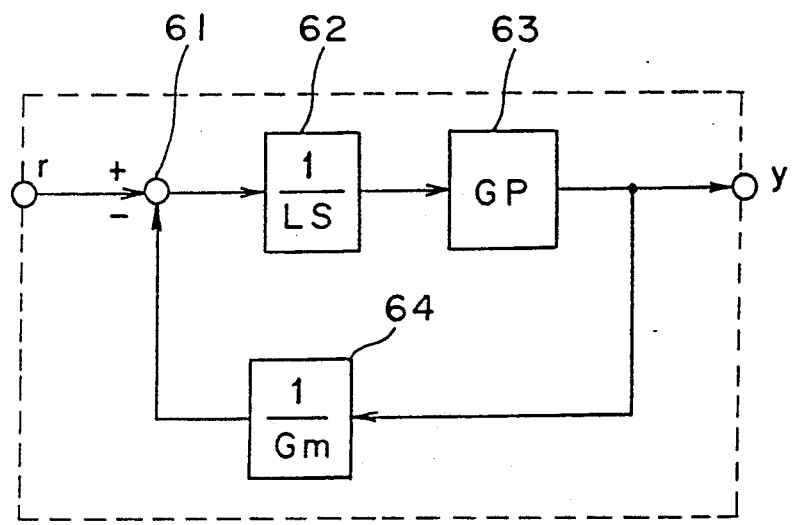
FIGS. 8(a) and 8(b) are operation principle charts of the control system shown in FIG. 7.
Figure 8B:
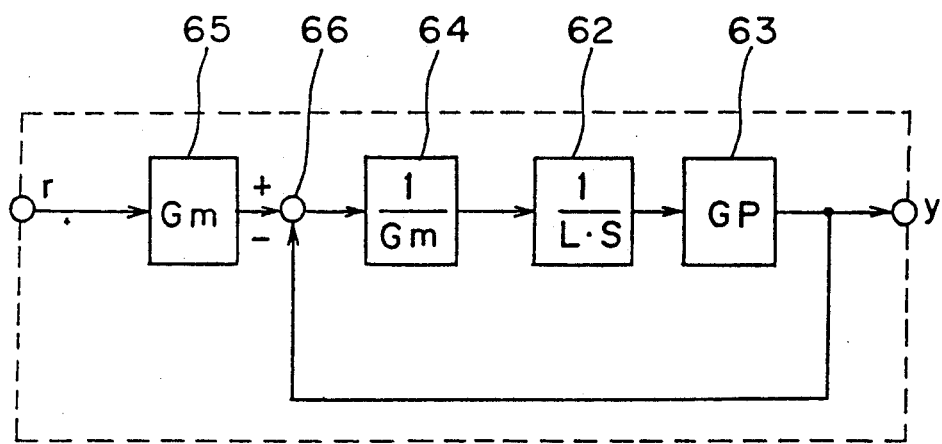

FIGS. 8(a) and 8(b) show the operation principle of a control system shown in FIG. 7. FIG. 8(a) shows two blocks of the air conditioner 51 and the room characteristic element 52 of FIG. 7 with one block 63 being a control object, and with the transmission characteristics thereof being Gp. Also, in the integrating means 62, the integrating gain is assumed to be (1/L), with "s" being a Laplacean operator. Also, the desired dynamic characteristics and the reverse characteristics are shown as Gm and (1/Gm) respectively in the blocks 65 and 64. The block diagram of FIG. 8(b) shows the block of FIG. 8(a) deformed into the direct-coupled feedback system. Namely, the set value r is inputted into the comparison element 65 by way of a block 65 composed of the desired dynamic characteristics Gm. The comparing operation is effected with respect to the room temperature by the comparison element 66 so as to input the comparison results to the reverse characteristic element 64. The output of the reverse characteristic element 64. is inputted to the integrating means 62. The output of the integrating means 62 is inputted to the control object 63 as the operation amount. The room temperature detected from the control object 63 is fed back to the comparison element 66 so as to complete the control loop. If the open loop transmission characteristic of the loop is sufficiently large, and the loop is stable with the loop being closed, the input and output characteristics of the loop portion with the loop being closed becomes almost one. Therefore, the dynamic characteristics of the room temperature seen from the setting value r almost conforms to the desired dynamic characteristics 65.

Figure 9:
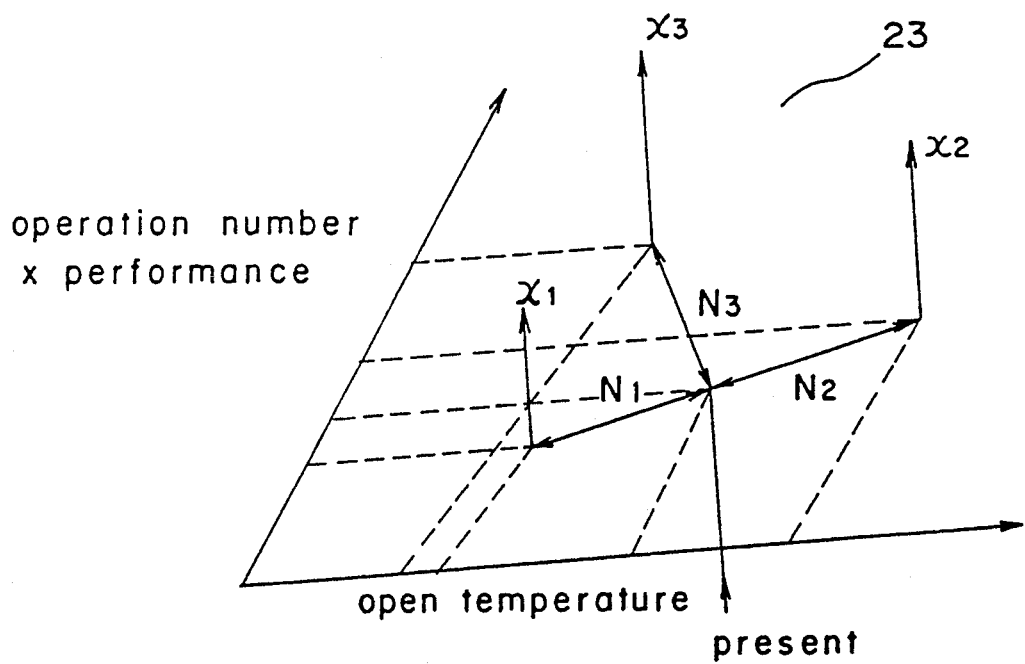
FIG. 9 is a chart of illustrating a first method for calculating the integration gain with respect to the operation condition variation.

FIG. 9 is a chart showing the operation principle of the parameter setting means 53 of FIG. 7. The integrating gain (1/L) about some values among the open air temperature, the total number of operation stand and the rated performance, and the variation amount of the suction pressure of the compressor are predetermined. They are assumed to be X1, X2, X3, . . . . If the present operation conditions are the same as the predetermined conditions, the value is fed to the integrating means 32. When the present driving conditions are different from the predetermined conditions, the shift between the present conditions and the predetermined conditions is calculated. In FIG. 9, the intervals N1, N2, N3, . . . between the present conditions and the predetermined conditions are used. The absolute value norm, Euclid norm or the like is considered the interval. The determined amounts are added and averaged with the interval ratio. The addition average X is obtained by the following equation where the interval is Ni.

$$X = \Sigma Xi \cdot (1/Ni) / \Sigma (1/Ni)$$

The integration gain (1/L) may be calculated by the calculation of the addition average in this manner.

If the operation conditions change and the dynamic characteristics of the control object change by this method, the loop is stably maintained by the provision of the proper integrating gain, so that the desired dynamic characteristics are normally obtained. Also, as the integrating gain changes continuously with respect to the continuous changes in the driving conditions, the control operation may be realized with the control condition being normally maintained. Although the determined conditional input of the integrating gain has been described with the open air temperature and the total amount of the rated performance of the indoor unit to be driven, the plane face may be considered a three-dimensional hyperplane of four-dimensional space when the variation amount in the suction pressure of the compressor, together with the open air temperature and the total amount of the rated performance of the driven indoor unit are used, thus having the same operation method.

Figure 10A:
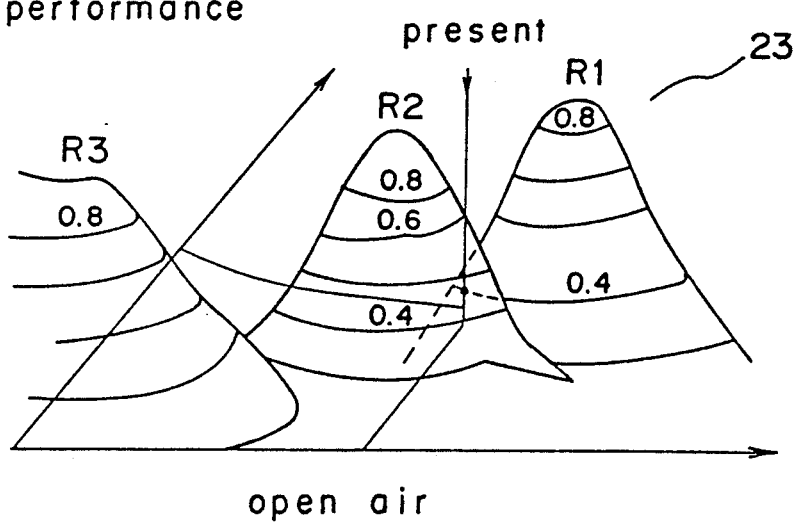
FIGS. 10(a) and 10(b) are charts for illustrating a method of calculating the integration gain with respect to the operation condition variation.
Figure 10B:
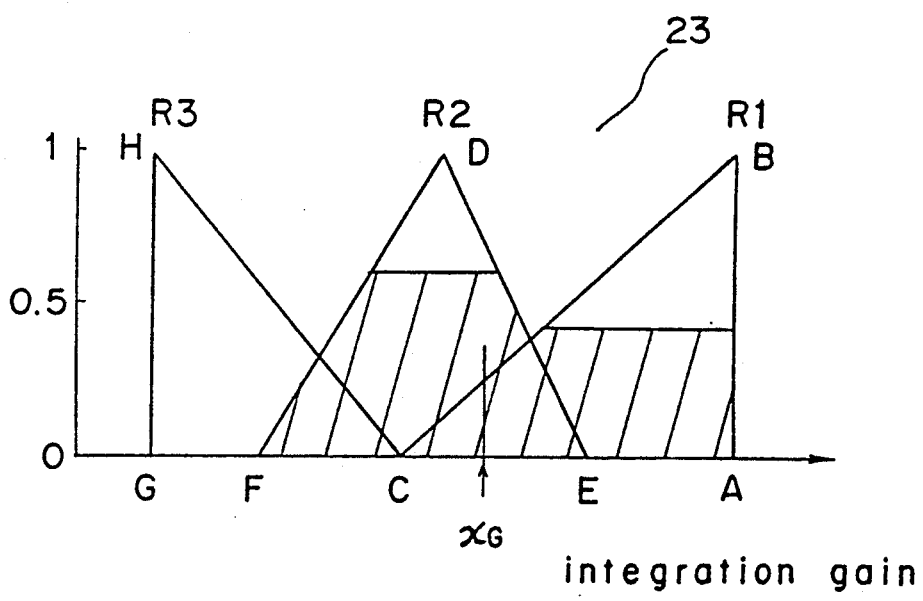

In FIGS. 10(a) and 10(b), the integrating gains are determined as the fuzzy set about some operation conditions. The adaptability of the predetermined gain may be defined as the membership function of the fuzzy logic about the driving conditions except for them. FIGS. 10(a) and 10(b) show a method of obtaining the adaptability with respect to the conditions to be determined with respect to the present driving conditions, and use fuzzy logic to determine the integrating gains to be actually used from the integrating gains as the fuzzy set. Although the description is effected with two parameters (the open air temperature and the rated performance total amount of the indoor machine to be driven) as in FIG. 9, the operation principle is the same if there are three parameters. FIG. 10(a) shows a process of calculating how much the driving conditions are adapted to the predetermined conditions. Namely, the adaptability degree with respect to the conditions R1, R2, R3, . . . is obtained under the present conditions. FIG. 10(a) shows an adaptation degree of 0.4 with respect to the conditions R1, an adaptation degree of 0.6 with respect to the conditions R2, and an adaptation degree of 0.0 with respect to the conditions R3. FIG. 10(b) shows the fuzzy induction method of obtaining the integrating gain X from the adaptation degree, with the integration gain being shown as the fuzzy amount corresponding triangle ABC with to the conditions R1. Similarly, the integration gain is shown with a triangle DEF with respect to R2, and is shown with triangle CGH with respect to the R3. As the adaptation degree of the conditions R1 is 0.4, the triangle ABC is cut off at a height of 0.4 so as to limit what is shown with oblique lines. Similarly, the triangle DEF is cut off at a height of 0.6 so as to limit what is shown within the oblique lines. As the triangle CGH is cut off, nothing remains. The gravity center XG of the oblique line portion obtained in this manner is obtained, where the value of the abscissa axis at this time is outputted, namely, it is outputted as the integrating gain. The integrating gain which changes continuously is obtained with respect to the change in the continuous driving conditions even in this manner.

In the second embodiment of the present invention, a method of using the integrating means has been described. If the proportional gain means having big gains and the means having the series-coupled characteristics of the low frequency passing means are used, similar effects may be provided.

Third Embodiment

Figure 11:
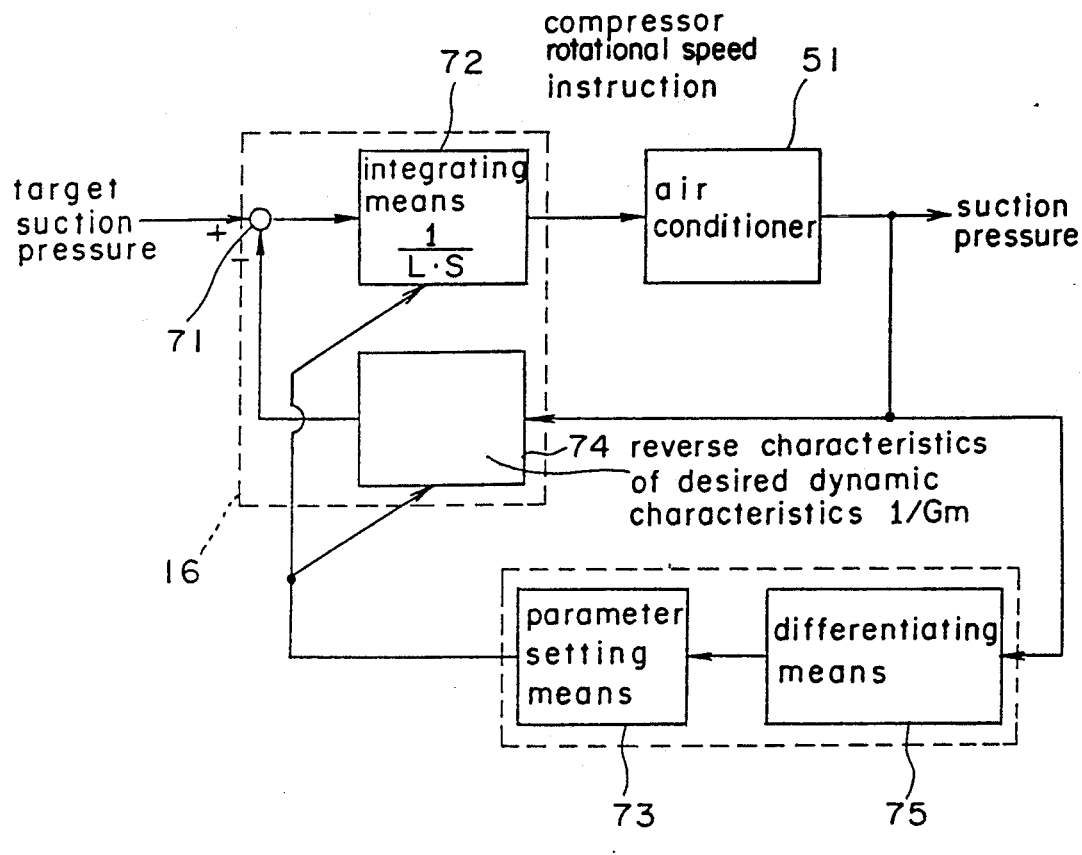
FIG. 11 is a block diagram of a control system in accordance with a third embodiment of the present invention.

A third embodiment of the present invention is described hereinafter. FIG. 11 is a block diagram showing the construction of the third embodiment. Namely, the depressed compressor suction pressures are inputted to the reverse characteristic means 74 of the desired dynamic characteristics, and the differentiating means 75. The output of the reverse characteristic means 74 of the desired dynamic characteristics is inputted to the comparator 71, and is compared with the suction pressure value so as to input the difference therebetween to the integrating means 72. The output of the integrating means 72 is inputted to the air conditioner 51 as a compressor rotational speed instruction. The compressor suction pressure is obtained by the air conditioner 51 so as to constitute a system for controlling the compressor suction pressure so as to be at a target value. Also, the output of the differentiating means 75 is fed to the parameter setting means 73 and is used to set the parameters of the desired dynamic characteristic reverse chartacteristic means 74 and the integrating means.

Figure 12:
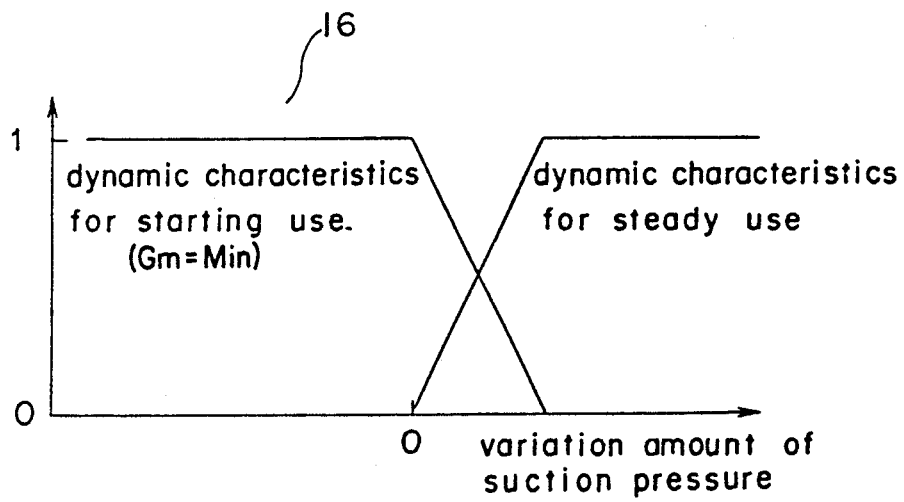
FIG. 12 is an operation principle chart for showing the parameter setting principle of the control system of FIG. 11.

FIG. 12 is a chart for showing the operation principle of the parameter setting means 73 of FIG. 11. Namely, the switching operation between the desired dynamic characteristics for starting operation use and the desired dynamic characteristics for steady state use are shown in accordance with the variation in the compressor suction pressure which is the input information. Namely, when the variation in the compressor suction pressure is negative, only the desired dynamic characteristics for the starting use is used. While the variation in the compressor suction pressure is slightly positive, the desired dynamic characteristics for the starting use and the desired dynamic characteristics for steady state use are mixed and used. When the variation of the compressor suction pressure becomes sufficiently positive, only the dynamic characteristics for steady state use are used. The desired dynamic characteristics at the starting time is set to a maximum value immediately in the operation amount (rotational speed instruction).

Figure 13:
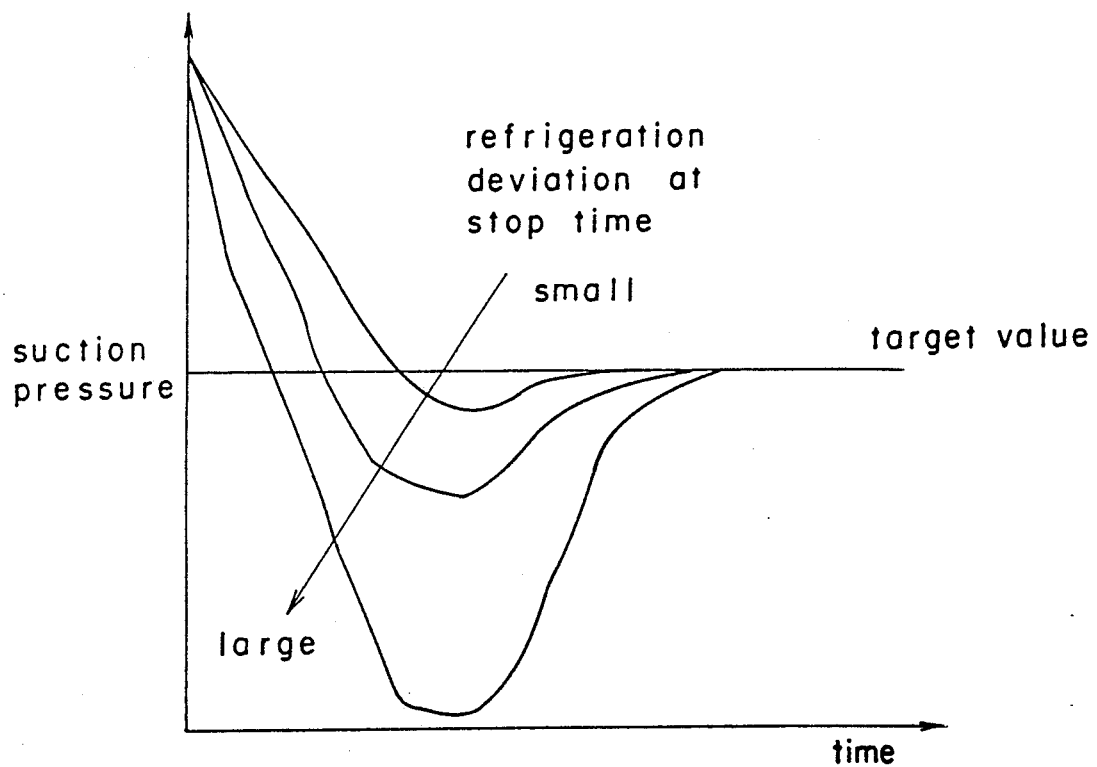
FIG. 13 is a starting characteristic chart in a case where the control system of FIG. 11 is applied.

FIG. 13 shows the control results of the contents of the parameter setting means shown in FIG. 12. The compressor suction pressure is suddenly lowered by the control in accordance with the dynamic characteristics for starting use. When the refrigerant sent from the compressor is adapted to be sucked up again as the time passes even when the drift of the refrigerant is large, the change in the suction pressure is increased. As it is switched to the model for steady state use by the fuzzy logic at this time, the compressor rotational speed instruction is reduced. The suction pressure rises when the compressor rotational speed instruction is reduced. When it rises so as to exceed the target value, to increases the compressor rotational speed instruction again. Namely, a feedback control is realized. Thus, the compressor suction pressure is controlled to be at the target value.

Figure 14:
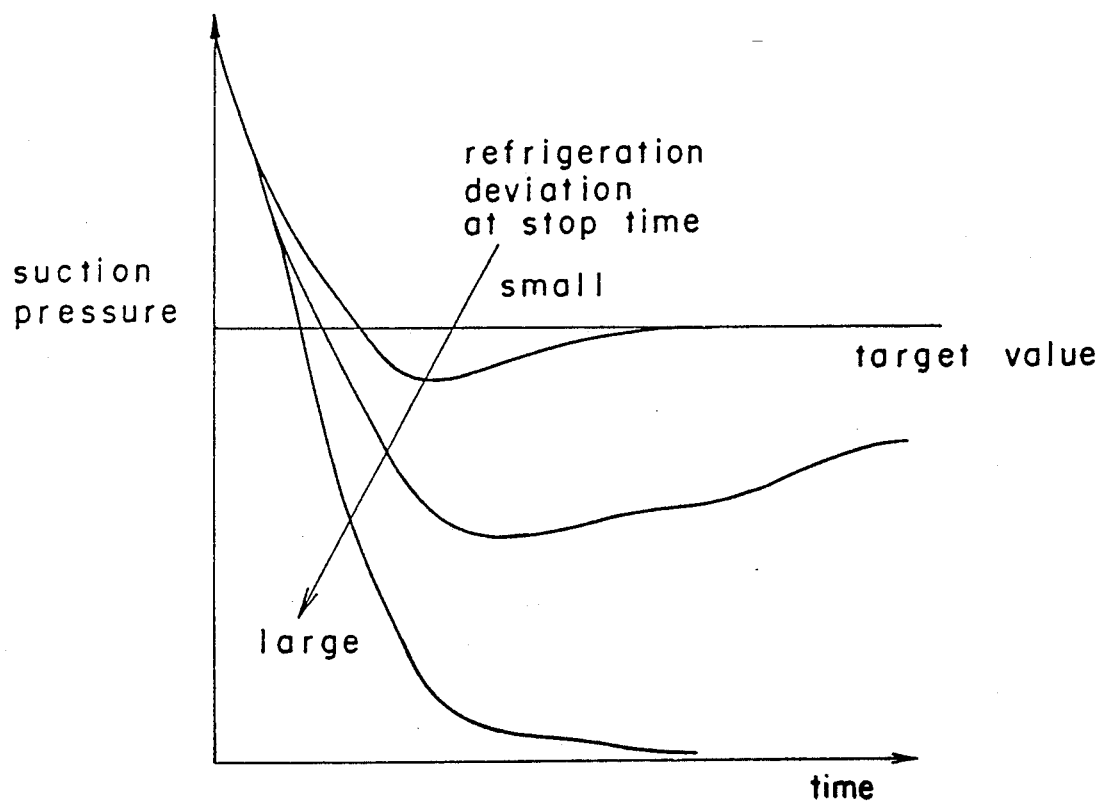
FIG. 14 is a starting characteristic chart in a case where the desired dynamic characteristics for starting use are not set.

In the control system of the conventional compressor, when the drift of the refrigerant becomes large after the passage of time during stoppage as shown in FIG. 14, the suction pressure is greatly reduced if the compressor is started so as to cause a phenomenon where the pressure is not restored to the target value. Namely, the suction pressure is lowered to cause a condition where the rotational speed of the compressor is lowered. In this condition, there is a defect in that the suction pressure cannot reach the target value.

Although the third embodiment of the present invention has been described for the suction pressure in the cooling operation, in the heating operation the load information of the indoor unit is detected by the compressor discharge pressure, and the compressor rotational speed instruction is controlled so that the discharge pressure may become certain. It is clear that the present invention may be applied similarly even in this case. As described hereinabove, the present invention provides a method of stably following up the set value if the operation conditions of the air conditioner of the multichamber type are changed a great amount, and the follow up performance may be normally retained constant.

Also, even in a case where the drift of the refrigerant is largely different, the stable starting operation may be effected.

Fourth Embodiment

Figure 15:
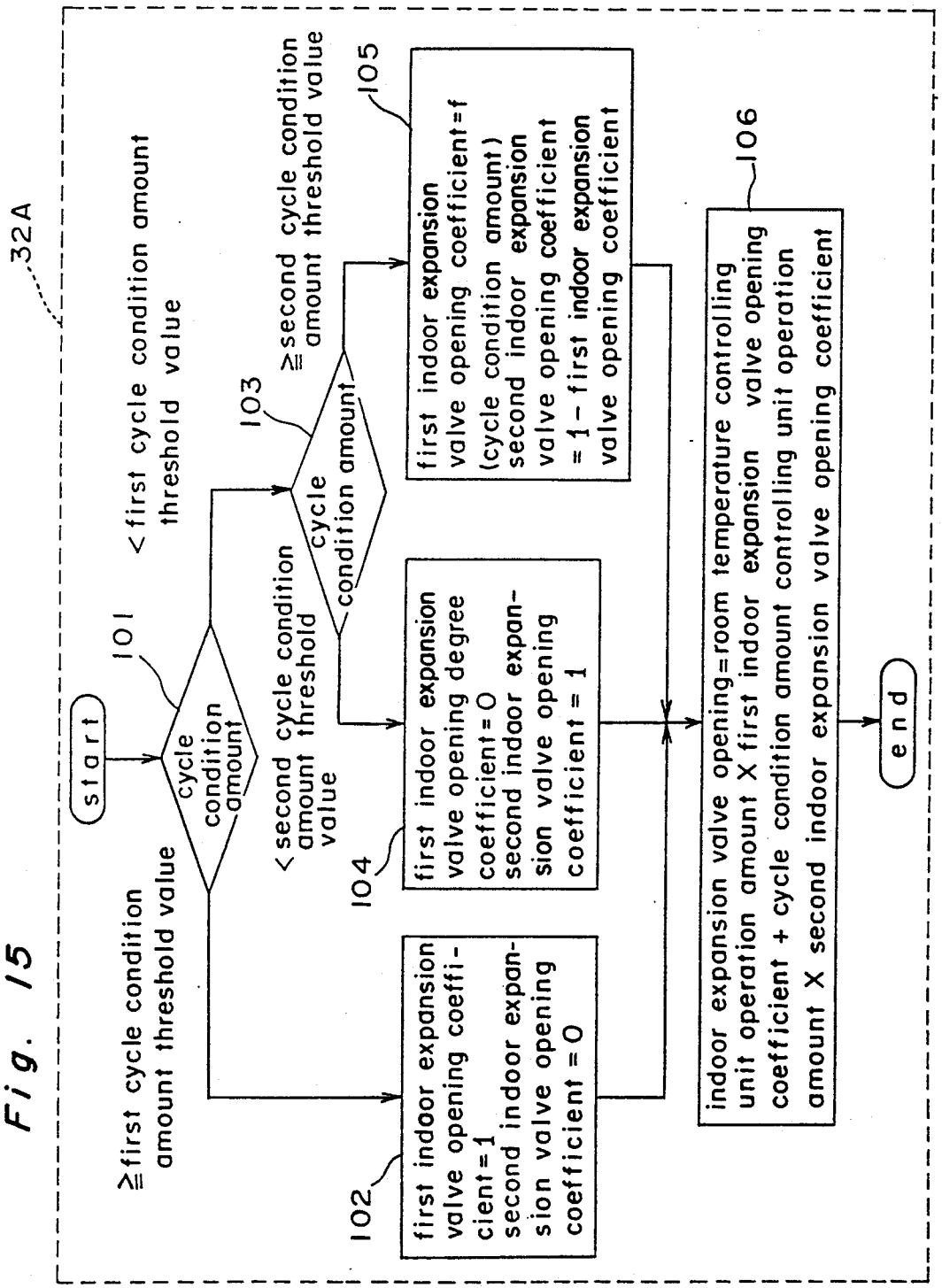
FIG. 15 is a flowchart for showing the operation of the indoor expansion valve operation amount deciding unit in accordance with a fourth embodiment of the present invention.

FIG. 15 is a flowchart showing the operation of an indoor expansion valve operation amount deciding unit in accordance with the fourth embodiment of the present invention. The outputs of the respective cycle condition amount detectors 32A, 32B, and 32C are compared with the first cycle condition amount threshold value (step 101). When the outputs of the respective cycle condition amount detectors 32A, 32B, and 32C are larger than the first cycle condition amount threshold value, each first indoor expansion valve opening coefficient is assumed to be 1, and each second indoor expansion valve opening coefficient is assumed to be 0 (step 102). When the outputs of the respective cycle condition amount detectors 32A, 32B, and 32C are smaller than the first cycle condition amount threshold value, the outputs of the respective cycle condition amount detectors 32A, 32B, and 32C are compared with the second cycle condition amount threshold value which is smaller than the first cycle condition amount threshold value (step 103). When the outputs of the respective cycle condition amount detectors 32A, 32B, and 32C are smaller than the second cycle condition amount threshold value, each second indoor expansion valve opening coefficient is assumed to be 1, and each first indoor expansion valve opening coefficient is assumed to be 0 (step 104). When the outputs of the respective cycle condition amount detectors 32A, 32B, and 32C are larger than the second cycle condition amount threshold value, the monotonous, continuous changes are effected in the arrangement from 0 to 1 in accordance with the outputs of the respective cycle condition amount detectors 32A, 32B, and 32C, and each first indoor expansion valve opening coefficient, and each second indoor expansion valve opening coefficient are set so that the total may become normally 1 (step 105). Thereafter, the openings of the respective indoor expansion valves 9A, 9B, and 9C are determined to be the total of the product of the operation amounts of the respective room temperature controlling units 15A, 15B, and 15C and each first indoor expansion valve opening coefficient and the product of the operation amounts of the respective cycle condition amount controlling units 34A, 34B, 34C and each second indoor expansion valve opening coefficient (step 106). The steps are carried out at constant time intervals.

Figure 16:
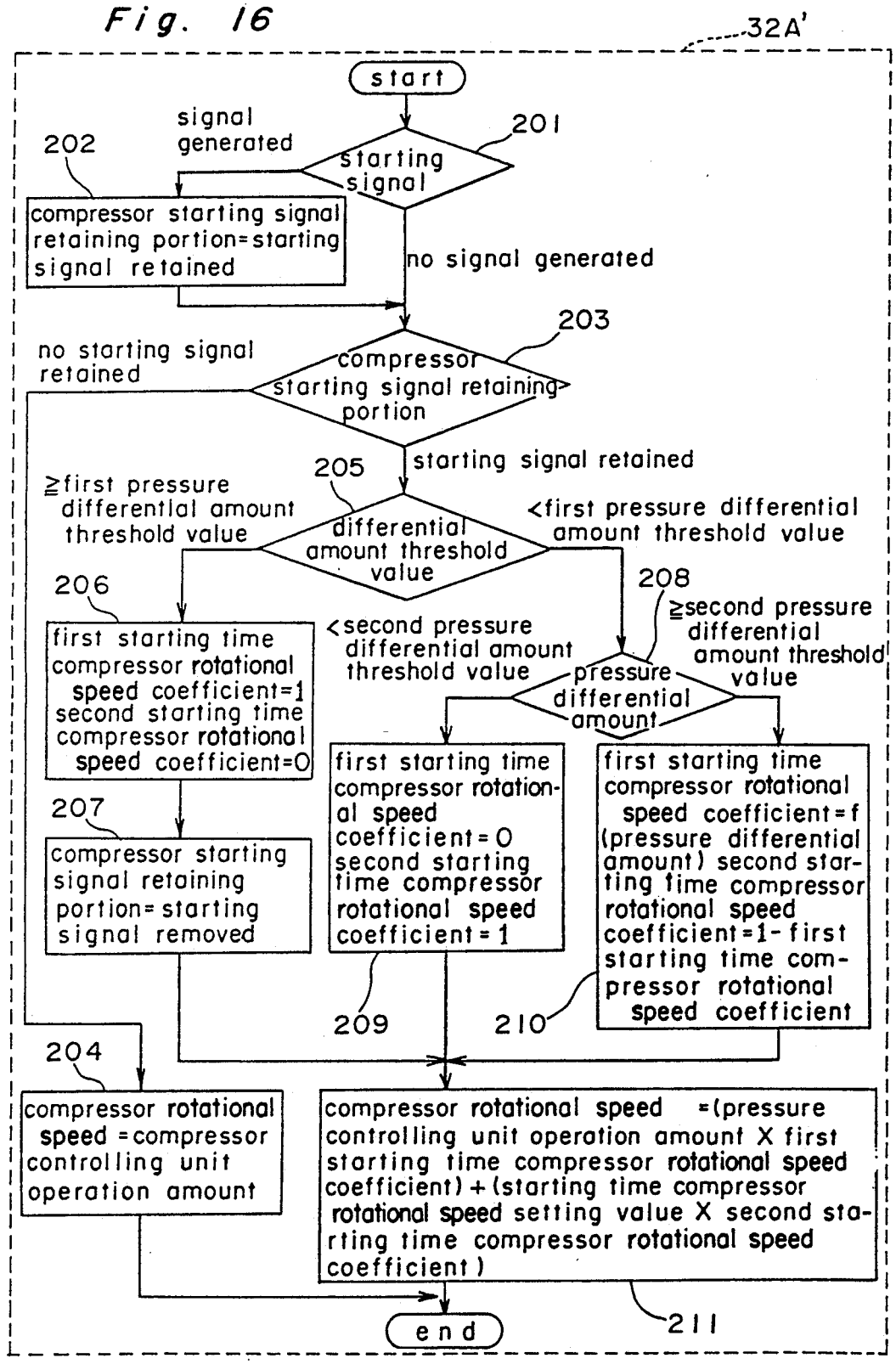
FIG. 16 is a flowchart showing the operation of a starting time compressor operation amount deciding unit showing a first modified example of the fourth embodiment of the present invention.

FIG. 16 is a flowchart showing the operation of the starting time compressor operation amount deciding unit as a first modified example of the fourth embodiment in accordance with the present invention. A determination is first made as to whether or not a starting signal has been output by the starting signal generator 36 (step 201). When the starting signal has been generated, the starting signal is retained (step 202) in the compressor starting signal retaining portion (step 202). When the starting signal is not generated, a determination is made as to whether or not the starting signal in the compressor starting signal retaining portion has been retained (step 203). When the starting signal has not retained in the compressor starting signal retaining portion, the operation amount of the pressure controlling unit 16 is selected as the operation amount of the compressor 1.

When the starting signal has been retained in the compressor starting signal retaining portion, a comparison is effected between the differential amount of the output of the pressure detector 14 and the first pressure differential amount threshold value (step 205). When the differential amount of the output of the pressure detector 14 is larger than the first pressure differential amount threshold value, the first starting time compressor rotational speed coefficient is assumed to become 1, and the second starting time compressor rotational speed coefficient is assumed to be 0 (step 206). Also, the starting signal of the compressor starting signal retaining portion is removed (step 207). When the differential amount of the output of the pressure detector 14 is smaller than the first pressure differential amount threshold value, a comparison is effected between the differential amount of the output of the pressure detector 14 and the second pressure differential amount threshold value which is smaller than the first pressure differential amount threshold value (step 208). When the differential amount of the output of the pressure detector 14 is smaller than the second pressure differential amount threshold value, the second starting time compressor rotational speed coefficient is assumed to be 1, the first starting time compressor rotational speed coefficient is assumed to be 0 (step 209). When the differential amount of the output of the pressure detector 14 is larger than the second pressure differential amount threshold value, the monotonous, continuous variation is effected in the range from 0 to 1 in accordance with the output of the differential amount of the output of the pressure detector 14, and the first starting time compressor rotational speed coefficient and each second starting time compressor rotational speed coefficient are set so that the total may become normally 1 (step 210). Thereafter, the rotational speed opening of the compressor 1 is determined to be a total of the product of the operation amount of the pressure controlling unit 16 and the first starting time compressor rotational speed coefficient, and the product of the starting time compressor rotational speed setting value and each second starting time compressor rotational speed coefficient (step 211). The steps are carried out at the constant time intervals.

Figure 17:
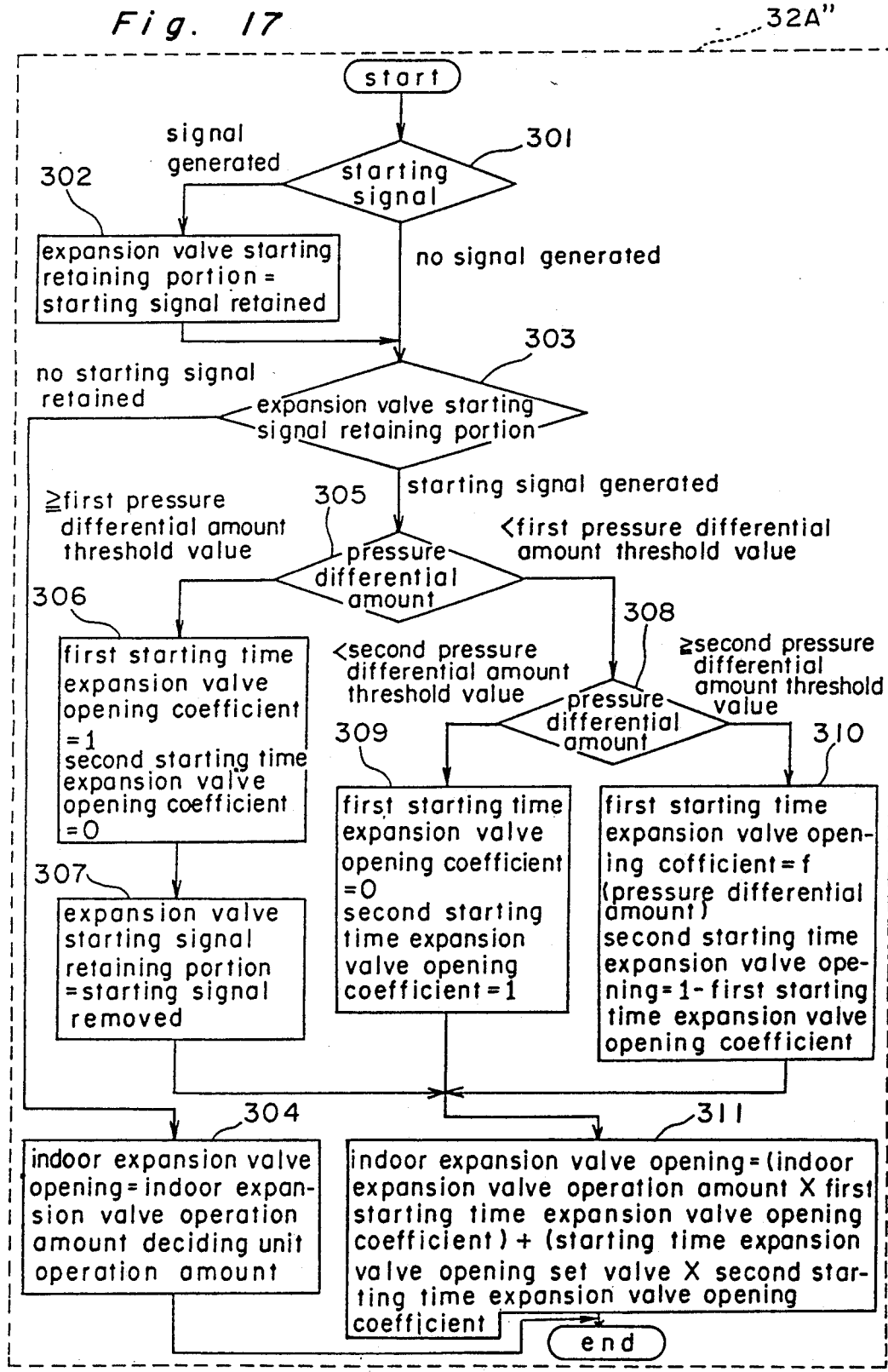
FIG. 17 is a flowchart showing the operation of a starting time indoor expansion valve operation amount deciding unit showing a second modified example of the fourth embodiment of the present invention.

FIG. 17 is a flowchart showing the operation of the starting time expansion valve operation amount deciding unit as a second modified example of the fourth embodiment of the present invention. A determination is first made as to whether or not the starting signal is output by the starting signal generator 36 (step 301). When the starting signal is output, the starting signal is retained in each expansion valve starting signal retaining portion (step 302). When the starting signal is not output, a determination is made as to whether or not the starting signal in each expansion valve starting signal retaining portion has been retained (step 303). When the starting signal has not been retained in each expansion valve starting signal retaining portion, the operation amounts of the respective indoor expansion valve operation amount deciding units 35A, 35B, and 35C are selected as the operation amounts of the respective indoor expansion valves 9A, 9B, and 9C (step 304).

When the starting signal has been retained in each expansion valve starting signal retaining portion, a comparing operation is effected between the differential amount of the output of the pressure detector 14 and the first pressure differential amount threshold (step 305). When the differential amount of the output of the pressure detector 14 is larger than the first pressure differential amount threshold value, each first starting time expansion valve opening coefficient is assumed to be 1, and each second starting time expansion valve opening coefficient is assumed to be 0 (step 306). Also, the starting signal of each expansion valve starting signal retaining portion is removed (step 307). When the differential amount of the output of the pressure detector 14 is smaller than the first pressure differential amount threshold value, a comparison is effected between the differential amount of the output of the pressure detector 14 and the second pressure differential amount threshold value which is smaller than the first pressure differential amount threshold value (step 308). When the differential amount of the output of the pressure detector 14 is smaller than the second pressure differential amount threshold value, each second starting time expansion valve opening coefficient is assumed to be 1, and each first starting time expansion valve opening coefficient is assumed to become 0 (step 309). When the differential amount of the output of the pressure detector 14 is larger than the second pressure differential amount threshold value, the monotonous, continuous changes are effected in a range from 0 to 1 in accordance with the output of the differential amount of the output of the pressure detector 14, and each first starting time expansion valve opening coefficient and each second starting time expansion valve opening coefficient are set so that the total is 1 (step 310). The openings of the respective indoor expansion valves 9A, 9B, and 9C are decided as the total of the product of the operation amounts by the respective indoor expansion valve operation amount deciding units 35A, 35B, and 35C and the respective first starting time expansion valve opening coefficients, and of the product of the respective starting time expansion valve opening set value and the respective second starting time expansion valve opening coefficients (step 311). The steps are carried out at constant time intervals.

The operation of the indoor expansion valve controlling unit and the compressor controlling unit of the multichamber shaped air conditioner of such a construction will be described hereinafter. When the respective room temperatures detected by the respective room temperature detectors 10A, 10B, and 10C are higher than the outputs of the respective room temperature setting units 17A, 17B, and 17C at during a cooling operation, the valve openings of the respective indoor expansion valves 9A, 9B, and 9C of the respective room temperature controlling units 15A, 15B, and 15C are operated in the opening direction, with the result that the refrigerant amount flowing into the respective indoor heat exchangers 8A, 8B, and 8C increases, the cooling performance increases to lower the respective room temperatures so as to conform to the outputs of the respective room temperature setting units 17A, 17B, and 17C. At this time, when the cooling performance to be required is larger than the proper performance of the respective indoor heat exchangers 8A, 8B, 8C, namely, is overload, the overheat amount to be detected by the respective overheat detectors 29A, 29B, and 29C, namely, the cycle condition amount, becomes smaller. When it becomes smaller than the second cycle condition amount threshold value, the operation amount is selected by the respective cycle condition amount controlling units 34A, 34B, and 34C in the respective indoor expansion valve operation amount deciding units 35A, 35B, and 35C, and the cooling performance of the respective indoor heat exchangers 8A, 8B, and 8C are restrained into the proper performance by the operation of the openings of the respective indoor expansion valves 9A, 9B, and 9C.

When the respective room temperatures are lowered to a certain extent, and the cooling performance to be required is near the proper performance of the respective indoor heat exchangers 8A, 8B, and 8C, the overheat amount to be detected by the respective overheat detectors 29A, 29B, and 29C, namely, the cycle condition amount, becomes gradually larger. When it is larger than the second cycle condition amount threshold value, and is smaller than the first cycle condition amount threshold value, the operation amounts where the operation amounts of the respective cycle condition amount controlling units 34A, 34B, and 34C, and the operation amounts of the respective room temperature controlling units 15A, 15B, and 15C are mixed, are selected in the respective indoor expansion valve operation amount deciding units 35A, 35B, and 35C, and the respective indoor heat exchangers 8A, 8B, and 8C are retained near the proper performance by the operation of the openings of the respective indoor expansion valves 9A, 9B, and 9C.

When the respective room temperatures are further lowered and the required cooling performance is lower than the proper performance of the respective indoor heat exchangers 8A, 8B, and 8C, the overheat amount to be detected by the respective overheat detectors 29A, 29B, and 29C, namely, the cycle condition amount, becomes larger. When it becomes larger than the first cycle condition amount threshold value, the operation amounts of the respective door temperature controlling units 15A, 15B, and 15C are selected in the respective indoor expansion valve operation amount deciding units 35A, 35B, and 35C. The respective room temperatures are controlled by the operation of the openings of the respective indoor expansion valves 9A, 9B, and 9C to conform to the outputs of the respective room temperature setting units 15A, 15B, and 15C.

Similarly, even during a heating operation, the operation amounts of the respective room temperature controlling units 15A, 15B, and 15C and the operation amounts of the respective cycle condition amount controlling units 34A, 34B, and 34C are selected by the overcooling amount, namely, the cycle condition amounts to be detected by the respective overcooling detectors 30A, 30B, 30C in the respective indoor expansion valve operation amount deciding units 35A, 35B, and 35C so as to realize the room temperature control in accordance with the proper performance of the respective indoor heat exchangers 8A, 8B, and 8C.

When the refrigerant is collected in the respective portions during the inoperative time, namely, in the maldistributing condition of the refrigerant, the refrigerant amount to be sucked into the compressor 1 becomes insufficient, so that at first, the pressure is suddenly lowered at the cooling start time and the differential value of the output of the pressure detector 14 shows a small value. When it is smaller than the second pressure differential amount threshold value, the starting time expansion valve opening setting value, which is a comparatively large value, is selected as the operation amounts of the respective indoor expansion values 9A, 9B, and 9C in the respective starting time indoor expansion valve operation amount deciding units 37A, 37B, and 37C. In the starting time compressor operation amount deciding unit 39, the starting time compressor rotational speed setting value, which is comparatively large, is selected as the operation amount of the compressor 1 so as to quickly remove the maldistribution of the refrigerant.

Therefore, when the refrigerant amount to be sucked into the compressor 1 gradually increases, the differential value of the output of the pressure detector 14 gradually becomes a large value and becomes larger than the second pressure differential amount threshold value and smaller than the first pressure differential amount threshold value, the operation amounts where the operation amounts of the respective indoor expansion valve operation amount deciding units 35A, 35B, and 35C are mixed with the operation amounts by the starting time expansion valve opening set value are selected as the operation amounts of the respective indoor expansion valves 9A, 9B, and 9C in the respective starting time indoor expansion valve operation amount deciding units 37A, 37B, and 37C; also, the operation amounts where the operation amounts by the pressure controlling unit 16 are mixed with the operation amounts by the starting time compressor rotational speed set value are selected as the operation amounts of the compressor 1 in the starting time compressor operation amount deciding unit 39 so as to gradually move to the pressure control and the room temperature control.

Further, when the maldistribution of the refrigerant has disappeared, the differential value of the output of the pressure detector 14 becomes larger and becomes larger than the first pressure differential amount threshold value, the operation amounts by the respective indoor expansion valve operation amount deciding units 35A, 35B, and 35C are selected as the operation amounts of the respective indoor expansion valves 9A, 9B, and 9C in the respective starting time indoor expansion valve operation amount deciding units 37A, 37B, and 37C; also, the operation amounts by the pressure controlling unit 16 are selected as the operation amounts of the compressor 1 in the starting time compressor operation amount deciding unit 39 so as to carry out the pressure control and the room temperature control.

The quick disappearance of the refrigerant maldistribution may be realized by the operation of the openings of the respective indoor expansion valve 9A, 9B, and 9C and the rotational speed of the compressor 1 by the operation amounts decided by the starting time compressor operation amount deciding unit 39 and the respective starting time indoor expansion valve operation amount deciding units 37A, 37B, and 37C, and such pressure response as shown in FIG. 9 is provided so as to quicken the rising at the starting operation time.

As is clear from the foregoing description, according to the air conditioner of multichamber type of the fourth embodiment of the present invention, in addition to the respective room temperature controlling units for controlling the temperatures of the respective rooms, there are each cycle condition detector for detecting cycle condition amount in the exit portion of each indoor heat exchanger, each cycle condition amount controlling unit for conforming each cycle condition amount detected to each set amount, each indoor expansion valve operation amount deciding unit for deciding the opening of each indoor expansion valve from the operation amount by each room temperature controlling unit and the operation amount by each cycle condition amount controlling unit in accordance with each cycle condition amount, so that the room temperature control may be realized in accordance with the normally proper cycle condition and the dispersion in the response of each room temperature by the drift of the refrigerant line is removed even in the overload condition as the room temperature setting value changes with time and so on. There are provided a starting time compressor operation amount deciding unit and a starting time indoor expansion valve operation amount deciding unit for switching, in accordance with the pressure differential amount, the starting time expansion valve opening set value and the starting time compressor rotational speed set value, so as to quickly remove the refrigerant maldistribution at the starting time with respect to the maldistribution of the refrigerant at the starting time; the quick disappearance of the refrigerant maldistribution may be realized by the operation of the opening of each indoor expansion valve and the rotational speed of the compressor by the operation amount decided by the starting time compressor operation amount deciding unit and the starting time indoor expansion valve operation amount deciding unit.

What is claimed is:

1. An air conditioner of the multichamber type comprising: a compressor; a condenser; an expansion valve; an evaporator; a means for detecting indoor temperatures of a plurality of chambers; a means for detecting the difference between a saturation temperature of refrigerant flowing through the air conditioner and an evaporator exit temperature of refrigerant leaving said evaporator; a means for controlling the indoor temperature of at least one of said chambers so as to be at a set temperature; a means for controlling the air conditioner so that the detected difference between said saturation temperature of the refrigerant and said evaporator exit temperature becomes equal to a set value; a means for controlling the performance of the compressor and the opening of the expansion valve so that the detected indoor temperature of at least one of said chambers becomes equal to one set value when the difference between the detected saturated temperature of the refrigerant and the evaporator exit temperature is larger than a first threshold value, and for controlling the performance of the compressor and the opening of the expansion valve so that the temperature difference does not become smaller than a second threshold value when the detected temperature difference is smaller than the second threshold value which is smaller than the first threshold value, and for switching the operation of the air conditioner with respect to the first and the second thresholds by ambiguous logic to obtain a desired operation in a case where the temperature difference is between the first threshold value and the second threshold value.

2. An air condition of the multichamber type comprising: a compressor; a condenser; an expansion valve and an evaporator; a refrigerant which is distributed in piping from the condenser to a plurality of units each composed of an expansion valve and evaporator, with the refrigerant traveling through the plurality of units and then fed into said compressor by piping; a means for detecting the difference between a saturated temperature of the refrigerant and an evaporator exit temperature of refrigerant leaving said evaporator; a means for detecting the indoor temperature of at least one of said chambers; a means for detecting an amount of overheat in each of the units by measuring the refrigerant temperature of the refrigerant leaving the expansion valve and the refrigerant temperature of the refrigerant leaving the evaporator as the saturated temperature; and for controlling the operation of the air conditioner so that the amount of overheat of a unit is not reduced when the detected overheat amount is smaller than a constant value, and for controlling the performance of the compressor and the opening of the expansion valve so that the detected indoor temperature becomes equal to the set value with respect to a unit when the overheat amount is larger than the constant value.

3. An air conditioner of the multichamber type which has one outdoor unit comprising: a compressor; an outdoor heat exchanger; an outdoor expansion valve connected in parallel with a plurality of indoor units provided with an indoor heat exchanger, and an indoor expansion valve, the air conditioner comprising: a pressure detector for detecting the pressure of refrigerant contained in piping on a gas side of respective indoor units; room temperature detectors for detecting each room temperature of each room containing an indoor unit; a cycle condition amount detector for detecting each cycle condition amount of an indoor heat exchanger which is an overheat amount during a cooling operation of the indoor heat exchanger and is an overcooling amount during a heating operation of the indoor heat exchanger, said cycle condition amount being detected by measuring the temperature of the refrigerant leaving the indoor heat exchanger; a pressure controlling unit for determining the rotational speed of the compressor for setting the refrigerant pressure of the refrigerant within the compressor to a set value; room temperature controlling units for controlling the opening of each of the indoor expansion valves for setting each room temperature to respective set values; cycle condition amount controlling units for controlling the opening of each of the indoor expansion valves for setting each of the cycle condition amounts to respective set values; a starting signal generator for transmitting a signal at a compressor operation starting time; indoor expansion valve operation amount deciding units for controlling the openings of the respective indoor operation valves in accordance with the respective cycle condition amounts, the operation amounts of the respective room temperature controlling units, and the operation amounts of the respective cycle condition amount controlling units; a starting time compressor operation amount deciding unit for controlling the rotational speed of the compressor in accordance with the starting signal from the starting signal generator, the refrigerant pressure and the operation amount of the pressure controlling unit; starting time indoor expansion valve operation amount decided units for controlling the opening of the respective indoor expansion valves in accordance with the starting signal from the starting signal generator, the refrigerant pressure, and the operation amount of the respective indoor expansion valve operation amount deciding units.

* * * * *